United States Patent [19]

Powers et al.

[11] Patent Number: 5,369,468
[45] Date of Patent: Nov. 29, 1994

[54] PHOTOGRAPHIC PRINTING APPARATUS AND METHOD

[75] Inventors: John W. Powers, Springfield; Daniel G. Choate, Everton, both of Mo.

[73] Assignee: Western Litho Plate & Supply Co., St. Louis, Mo.

[21] Appl. No.: 135,264

[22] Filed: Oct. 12, 1993

[51] Int. Cl.$^5$ ............................................. G03B 27/04
[52] U.S. Cl. .......................................... 355/99; 355/85; 355/91; 355/94; 355/97
[58] Field of Search ...................... 355/85, 91, 94, 97, 355/99

[56] References Cited

U.S. PATENT DOCUMENTS

| | | | |
|---|---|---|---|
| 4,423,955 | 1/1984 | Powers | 355/99 |
| 4,575,233 | 3/1986 | Copeland et al. | 355/85 |
| 4,614,425 | 9/1986 | Copeland et al. | 355/99 |
| 4,931,833 | 6/1990 | Elwing | 355/85 |
| 4,951,089 | 8/1990 | Powers | 355/85 |

Primary Examiner—Michael L. Gellner
Assistant Examiner—Daniel P. Malley
Attorney, Agent, or Firm—Senniger, Powers Leavitt & Roedel

[57] ABSTRACT

Automated apparatus and method for exposing lithographic plates to light through films and masks. The method involves placing a plate, film and mask at an exposure station in superposed relation to one another with the film overlying the plate and the mask overlying the film, exposing the plate to light through the mask and film at the exposure station, raising the mask off the film to a raised position, gripping the film and moving it relative to the plate to expose a portion of the plate therebelow, gripping the exposed portion of the plate, gripping the mask in its raised position, moving the film, plate and mask forwardly while so gripped to a discharge station, and releasing the film, plate and mask at the discharge station.

14 Claims, 14 Drawing Sheets

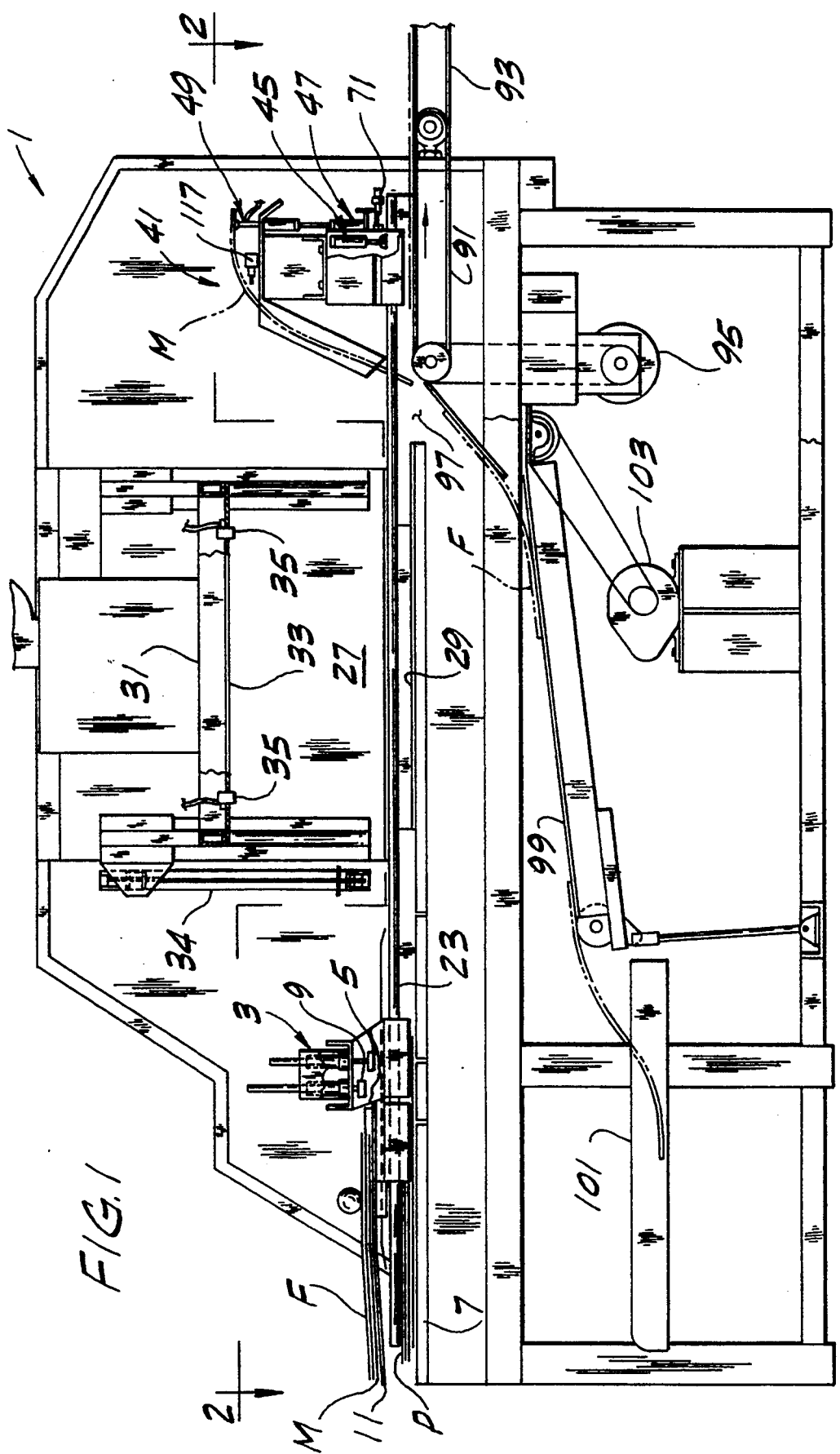

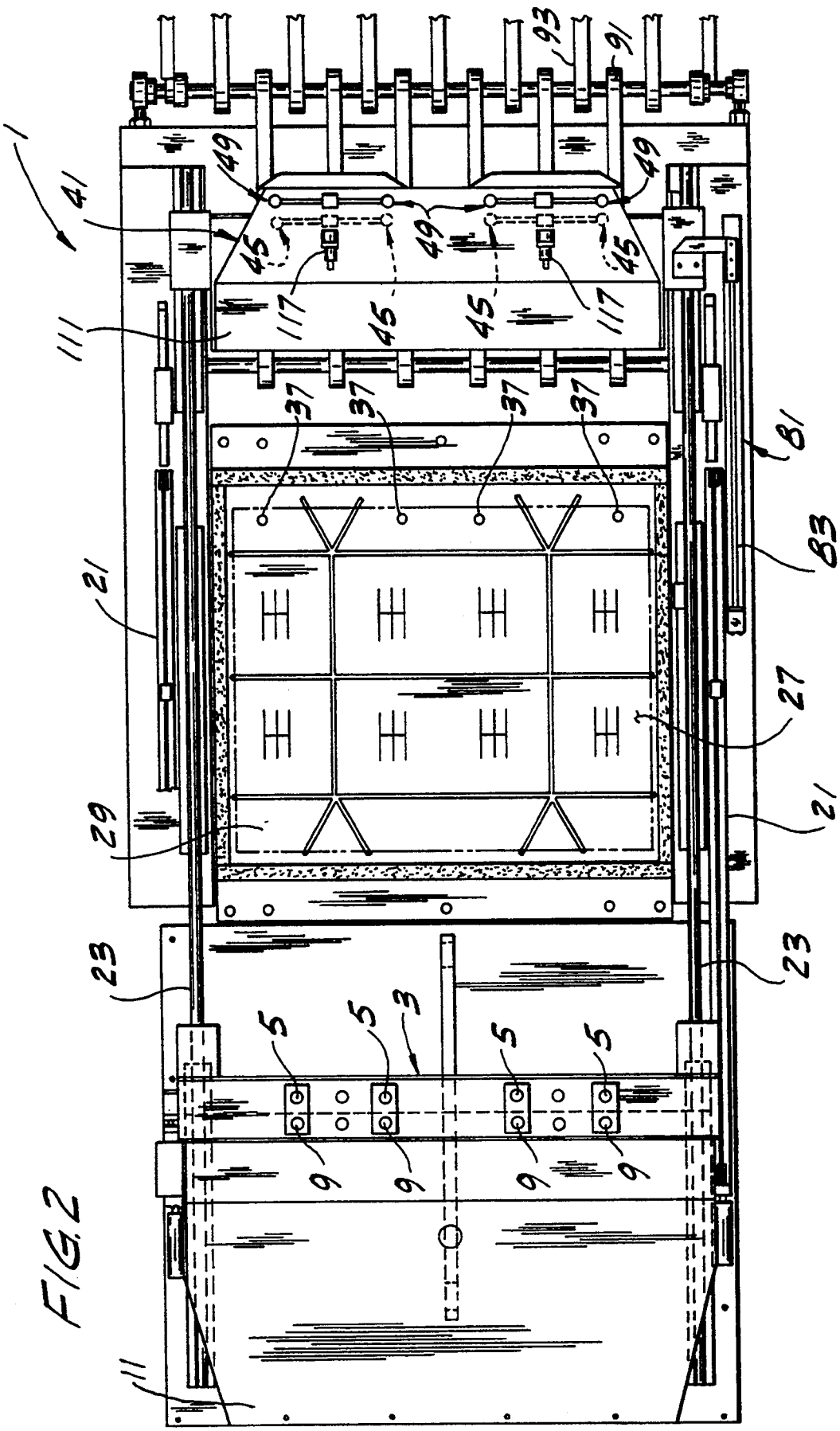

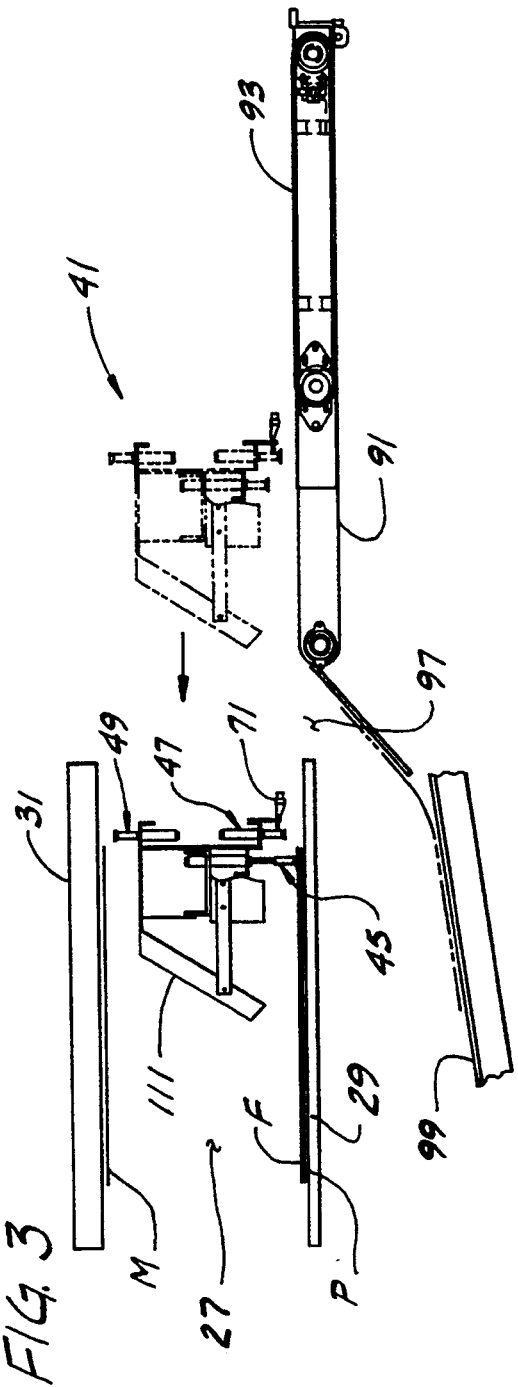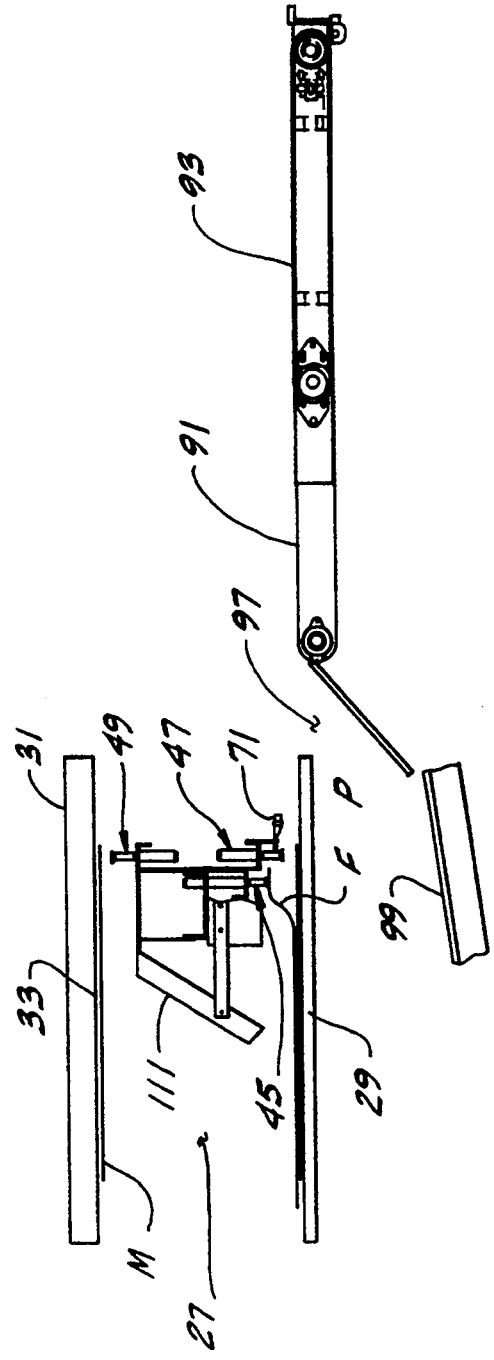

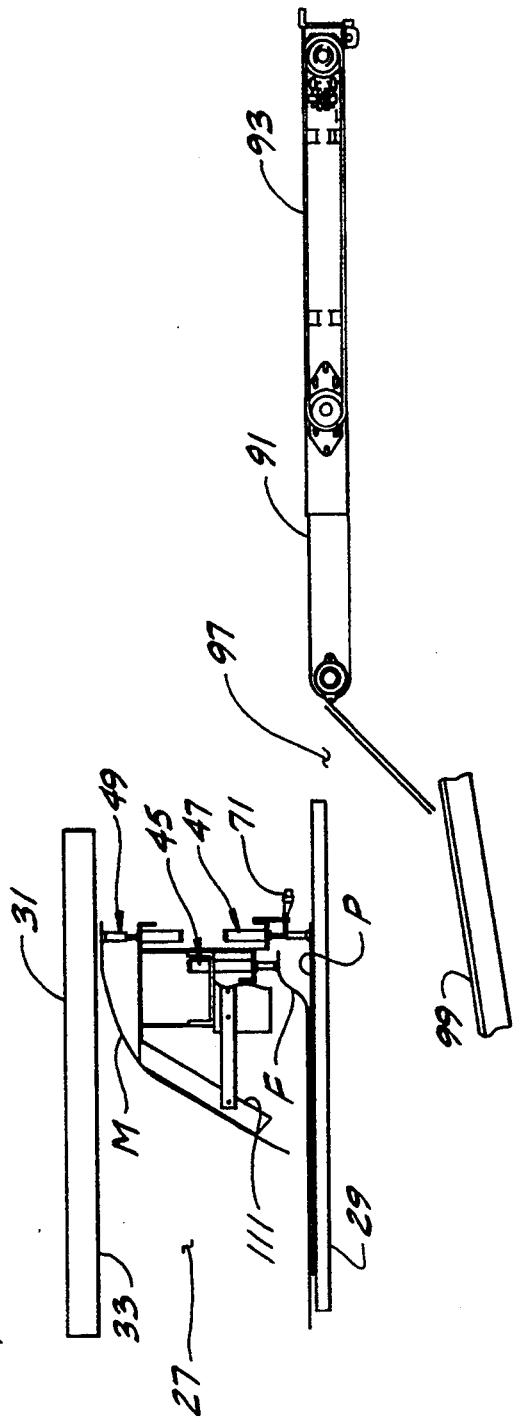
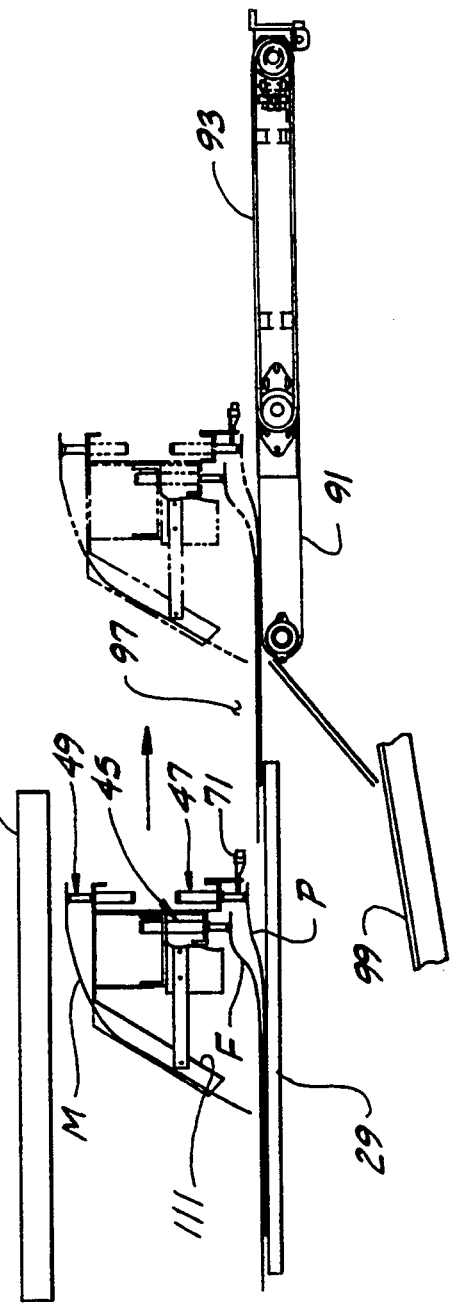

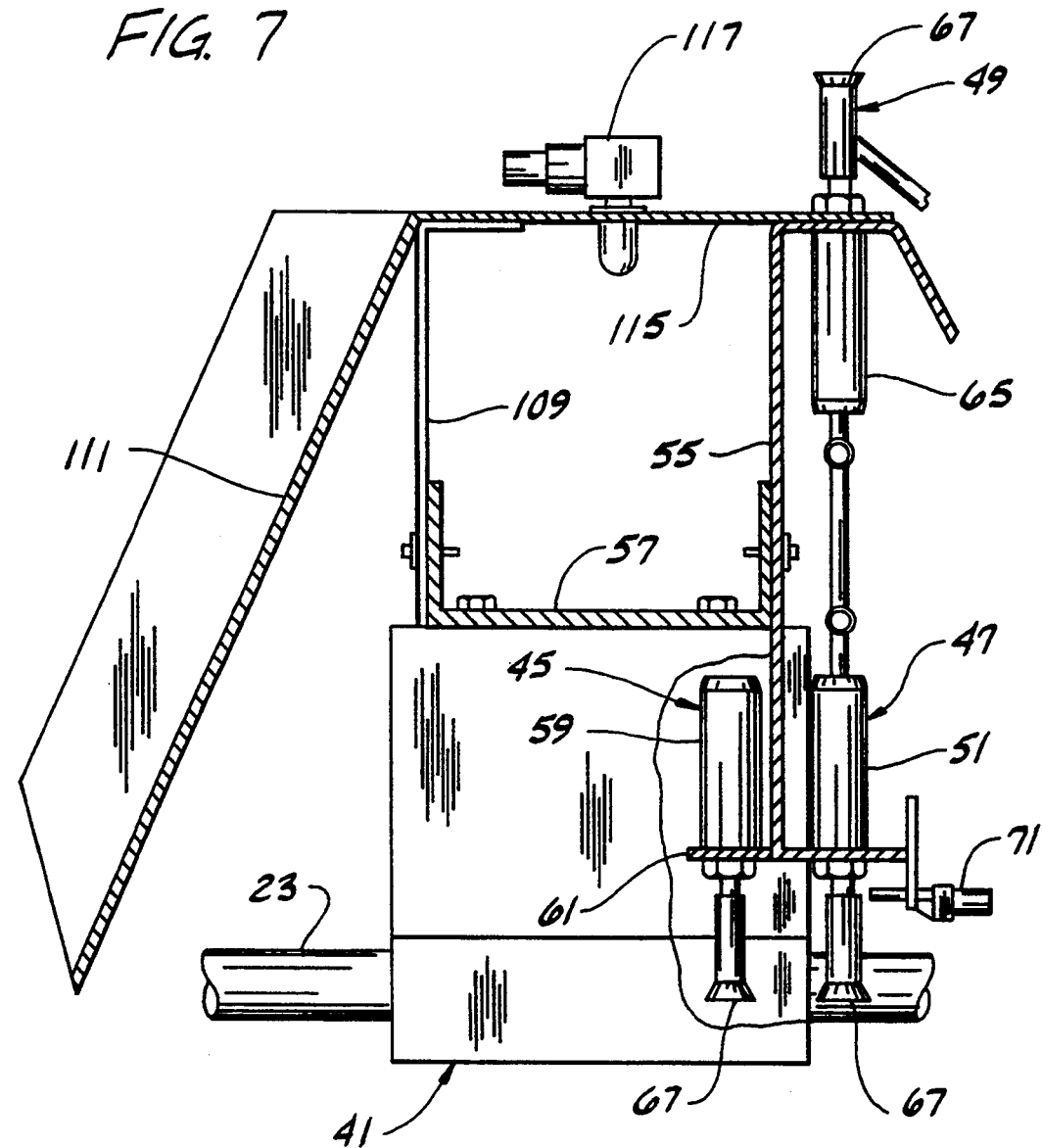

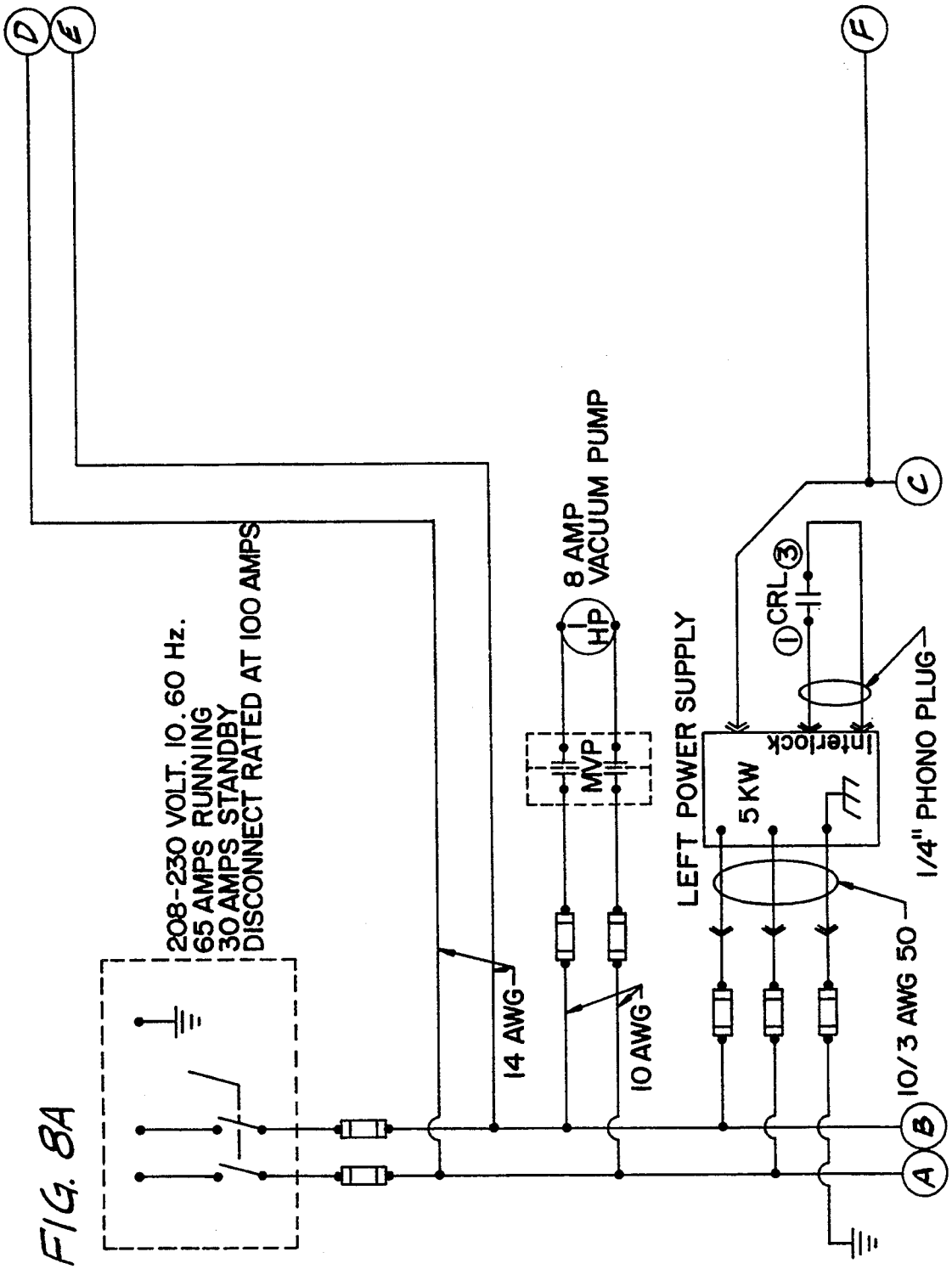

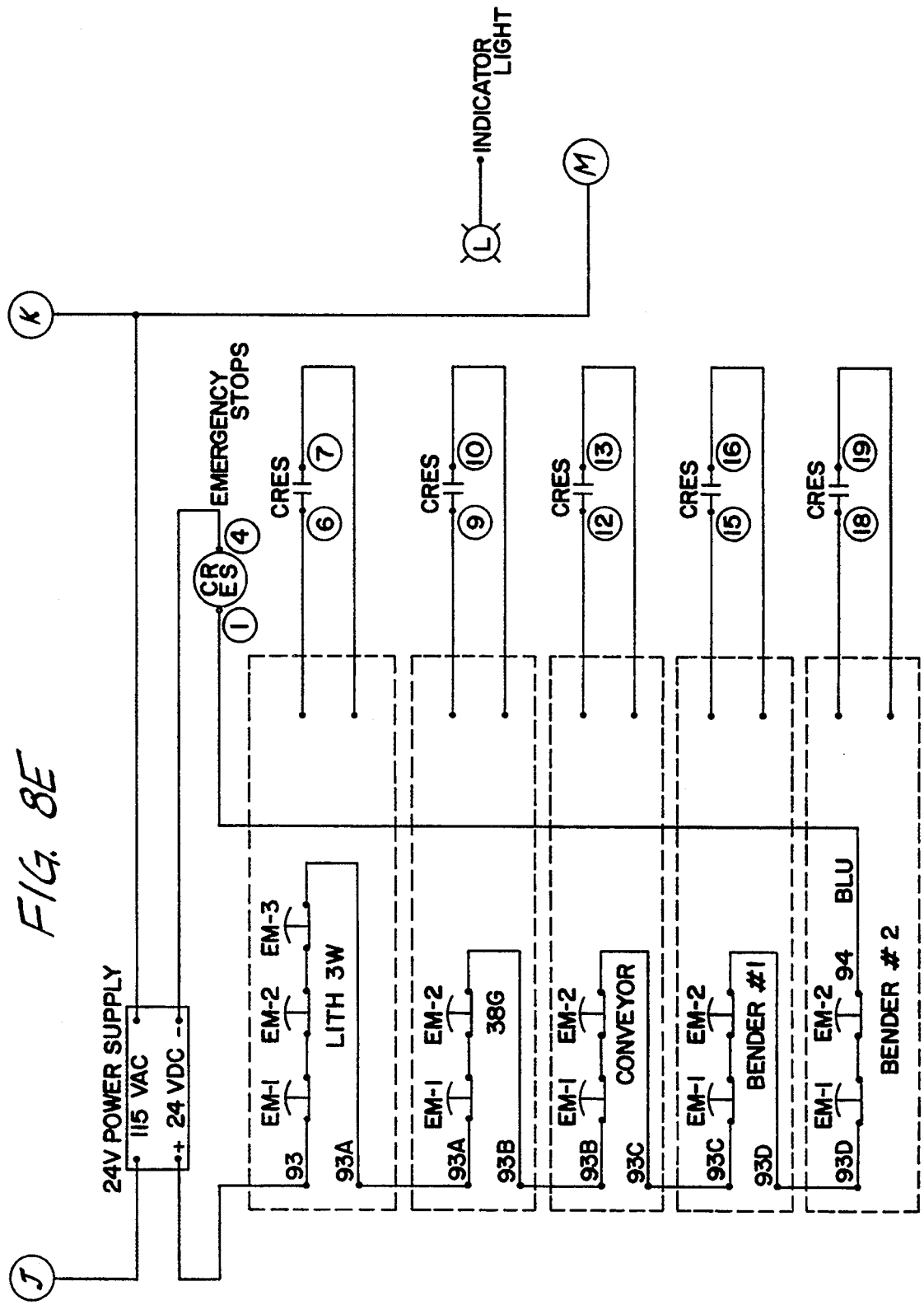

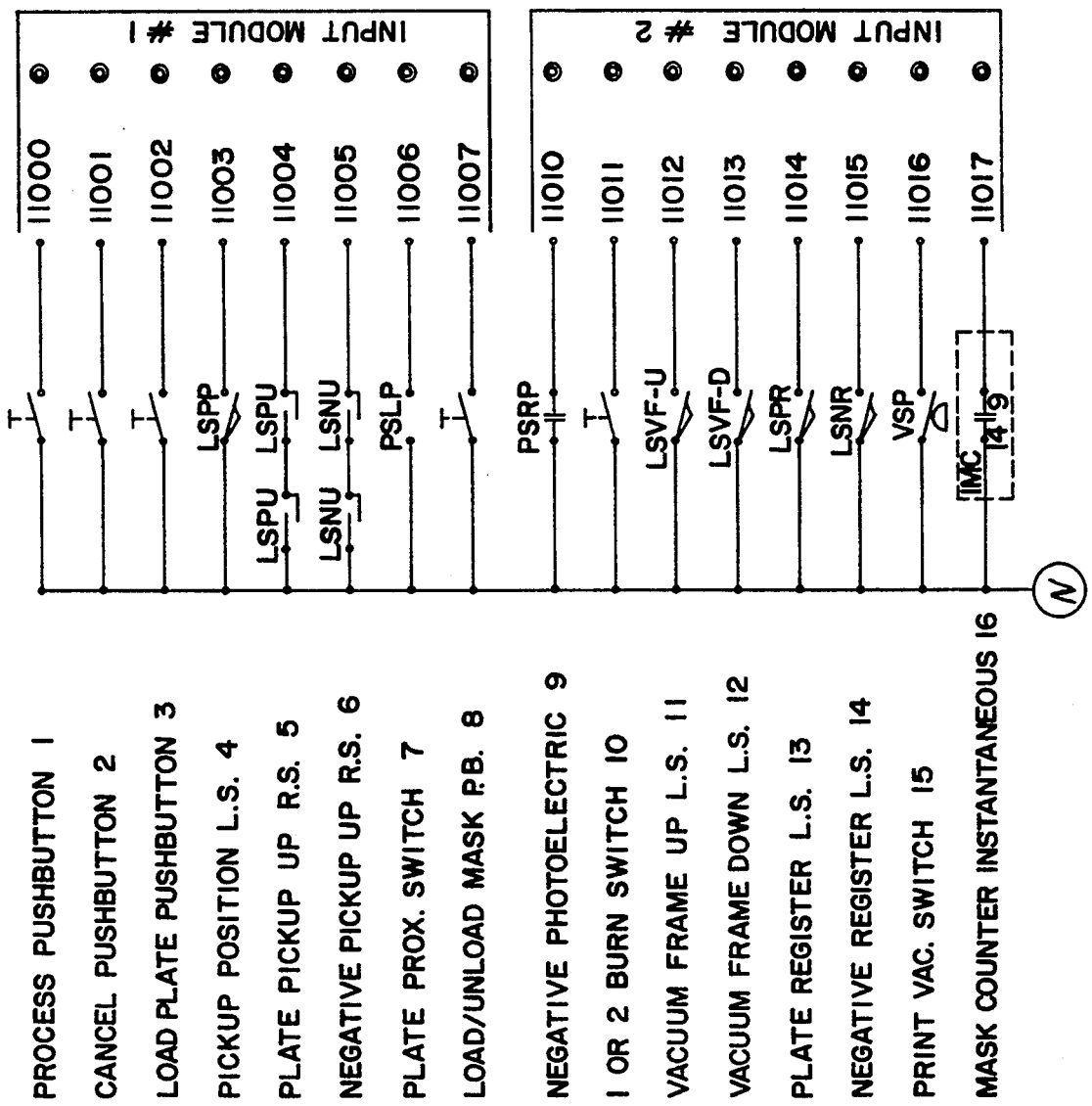

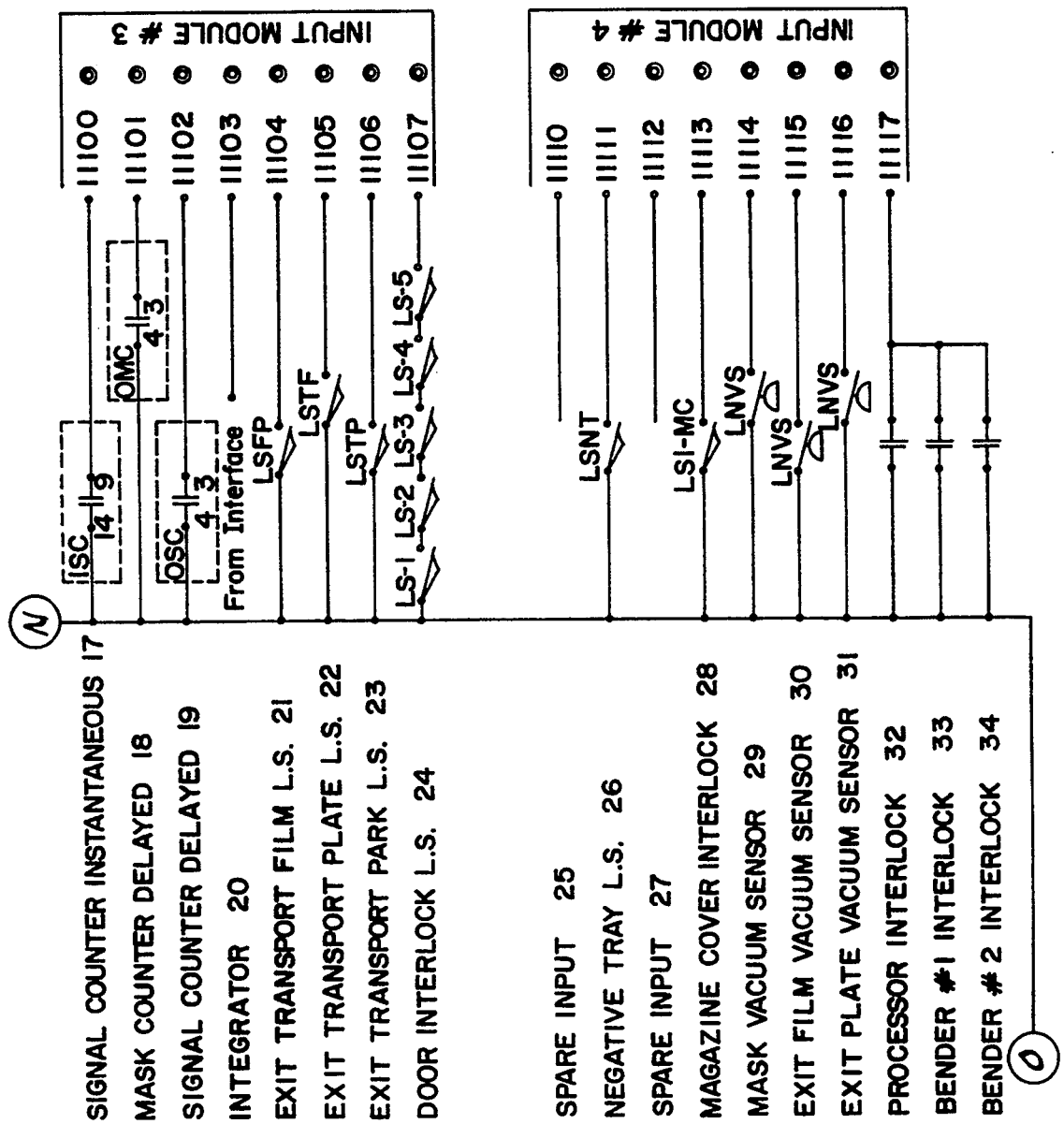
FIG. 8G (INPUTS 17-34)

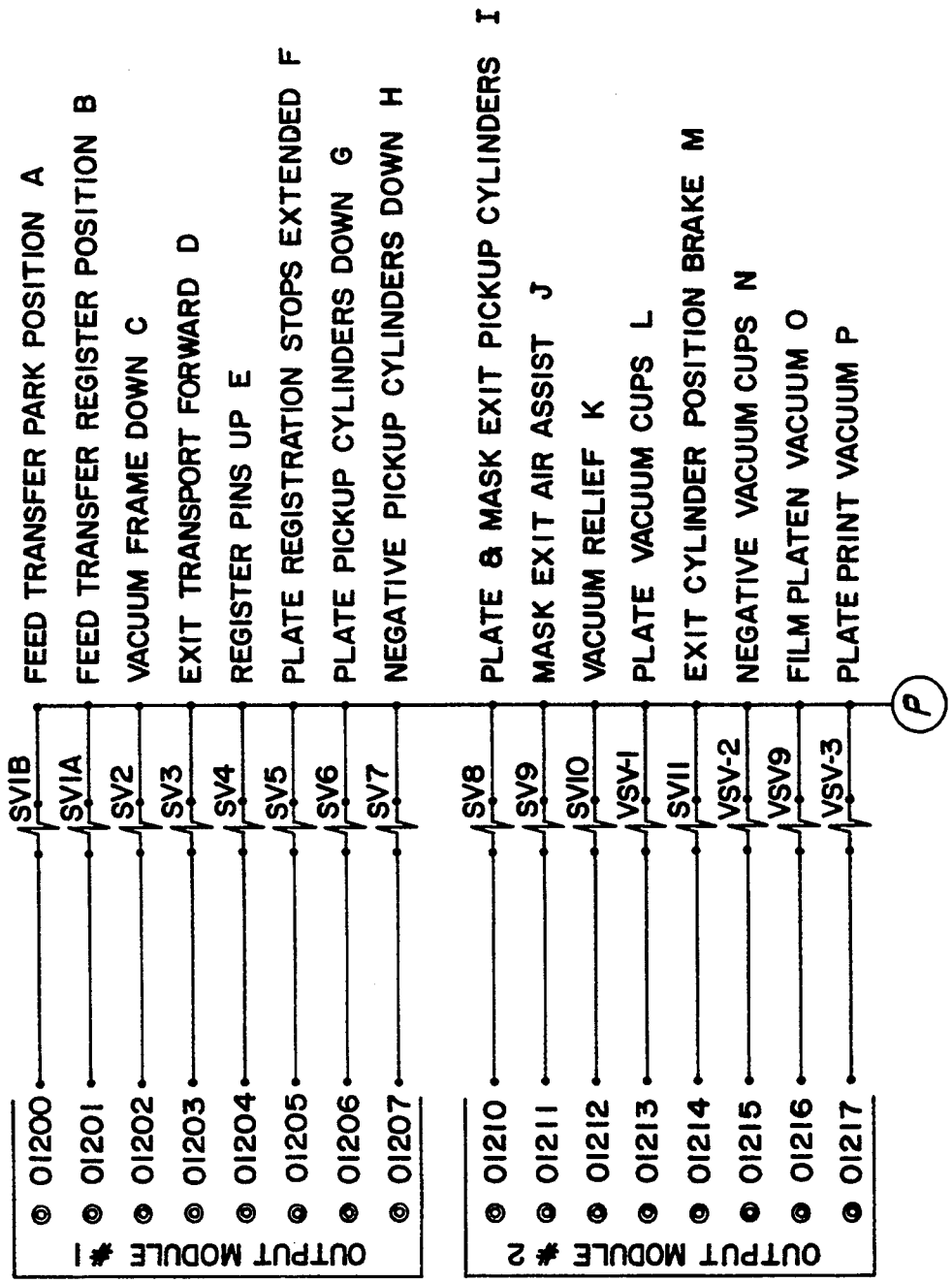
FIG. 8H (OUTPUTS A-P)

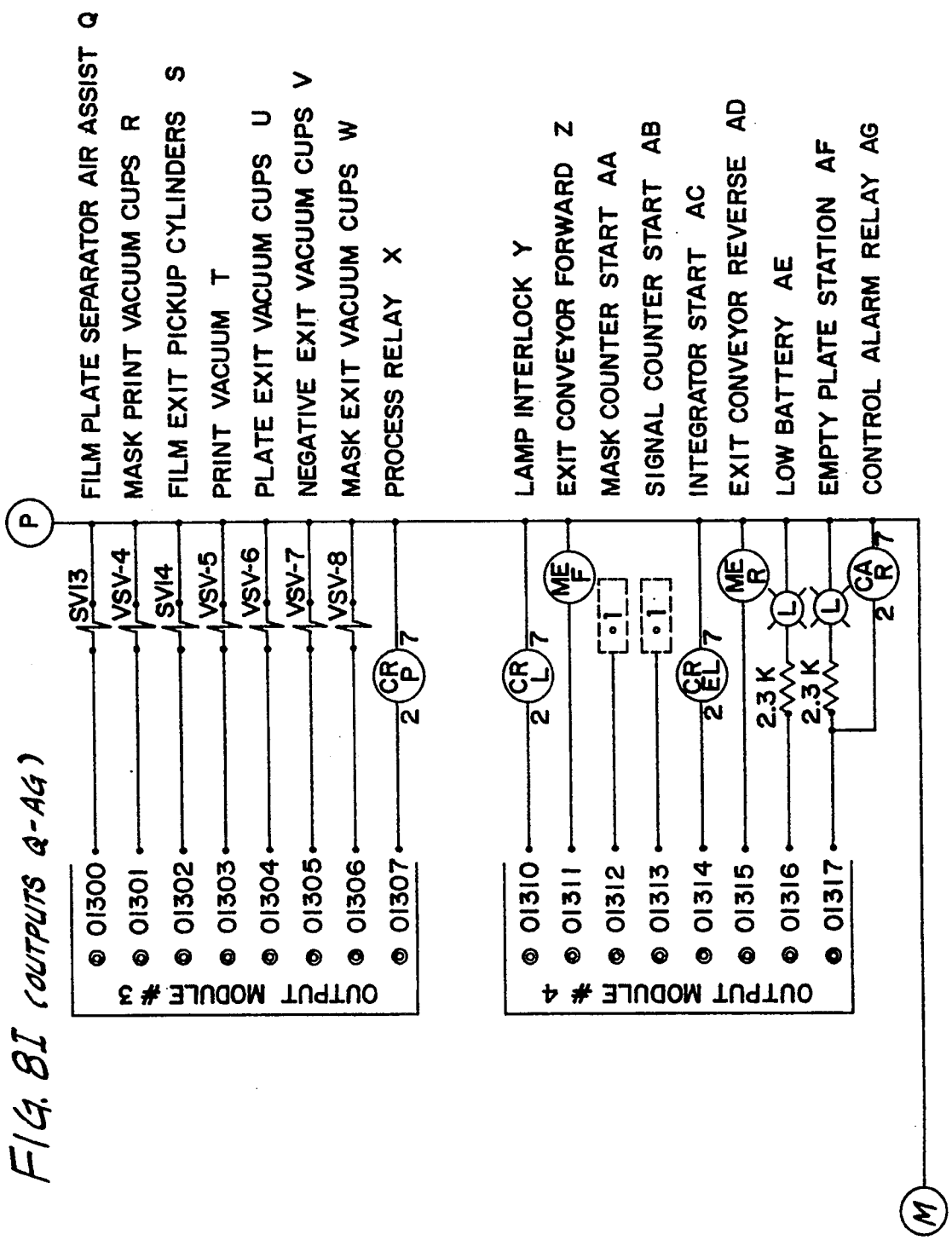

PHOTOGRAPHIC PRINTING APPARATUS AND METHOD

BACKGROUND OF THE INVENTION

This invention relates generally to photographic printing apparatus, and more particularly to such apparatus which is capable of automated exposure of photosensitized plates to light using both masks and films.

This present invention represents a modification of the apparatus shown in co-assigned U.S. Pat. No. 4,423,955. This apparatus provides for the automated exposure of photosensitized (lithographic) plates to light through films, and is particularly for use in newspaper printing operations to expose plates to light through photographic negatives of the newspaper pages. The apparatus described in the patent is not equipped for automated handling of masks. It will be noted in this regard that masks are commonly used in the processing of plates used in commercial printing applications, such as plates used in the printing of books and magazines. Such processing involves placing a plate, a film and a mask in superposed relation at an exposure station (with the film overlying the plate and the mask overlying the film), lowering a vacuum frame ("window") over the superposed sheets, and exposing the plate to light through the mask and film. An attempt has been made to automate this process by using apparatus substantially of the type described in U.S. Pat. No. 4,423,955, but modified so that the vacuum frame raises both the mask and the film off the plate after exposure of the plate is complete. In this modified apparatus, a discharge carriage travels to the exposure station, grips the plate and the film, and carries both to a discharge station where the plate and film are discharged. The carriage then returns to the exposure station for pickup and conveyance of the mask to the discharge station. This process is inefficient and further has required that the film be larger in size than the mask (to permit a mask and film to be simultaneously raised by the vacuum frame), which is typically not the case unless the film is reduced in size prior to the process.

There is a need, therefore, for apparatus for automating the exposure of lithographic plates when masks are involved.

SUMMARY OF THE INVENTION

Among the several objects of this invention may be noted the provision of apparatus and method for the automated exposure of plates through masks and films at an exposure station; the provision of such apparatus and method which does not require the films to be larger than the masks; the provision of such apparatus and method which provides for the return of masks and films in an orderly fashion to the infeed end of the apparatus for reuse; the provision of such apparatus and method which is capable of processing plates at high speeds; and the provision of such apparatus which is operable not only in an automated mode for exposing plates through masks and films, but also in an automated mode for exposing plates through films only.

In general, apparatus of the present invention comprises an exposure station at which a plate may be exposed to light through a film overlying the plate and through a mask overlying the film and plate, a support at the exposure station for supporting the superposed plate, film and mask, and a window at the exposure station movable downwardly from a raised position spaced above the support to a lowered position for exposure of the plate through the window, mask and film to a light source. Means associated with the window is operable to grip the mask to the bottom of the window, the window being movable to its raised position while gripping the mask after exposure of the plate. A discharge carriage is movable from a forward position forward of the exposure station to a rearward position at the exposure station when the window is in its raised position. Film discharge gripper means is movable up and down on the discharge carriage and is operable to grip a film overlying a plate on said support. Plate discharge gripper means is movable up and down on the discharge carriage and is operable to grip a plate on said support. Mask discharge gripper means is movable up and down on the discharge carriage and is operable to grip a mask on said window. Means is provided for operating the discharge carriage and each of said film, plate and mask discharge gripper means to move the discharge carriage rearwardly from its forward position to its rearward position when the window is in its raised position and gripping a mask, to lower the film discharge gripper means and actuate it to grip a film overlying a plate, to move the film discharge gripper means while gripping the film thereby to expose a portion of the plate under the film, to lower the plate discharge gripper means and to actuate it to grip the exposed portion of the plate, to raise the mask discharge gripper means and to actuate it to grip the mask on the window, and to move the discharge carriage forwardly to its forward position and deactuate the film, plate and mask discharge gripper means to release the film, plate and mask, respectively.

The present invention further involves an automated method of exposing photosensitized plates to light through masks and films at an exposure station. The method comprises the following steps:

placing a plate, film and mask at the exposure station in superposed relation to one another with the film overlying the plate and the mask overlying the film;

exposing the plate to light through the mask and film at the exposure station;

raising the mask off the film to a raised position;

gripping the film and moving it relative to the plate to expose a portion of the plate therebelow;

gripping the exposed portion of the plate;

gripping the mask in its raised position;

moving the film, plate and mask forwardly while so gripped to a discharge station; and releasing the film, plate and mask at the discharge station.

Other objects and features will be in part apparent and in part pointed out hereinafter.

BRIEF DESCRIPTION OF THE DRAWINGS

FIG. 1 is a side elevation of apparatus of this invention for exposing lithographic plates to light through masks and films, particularly for use in commercial book and magazine printing operations;

FIG. 2 is a top plan view of the apparatus of FIG. 1;

FIGS. 3–6 are views illustrating steps in the discharge of a plate, film and mask from the exposure station;

FIG. 7 is a side elevation of the discharge carriage of the apparatus of FIGS. 1 and 2; and FIGS. 8A–8I are schematics of circuitry suitable for operation of the present invention.

Corresponding reference characters indicate corresponding parts throughout the several views of the drawings.

DESCRIPTION OF THE PREFERRED EMBODIMENT

Figure 8B:
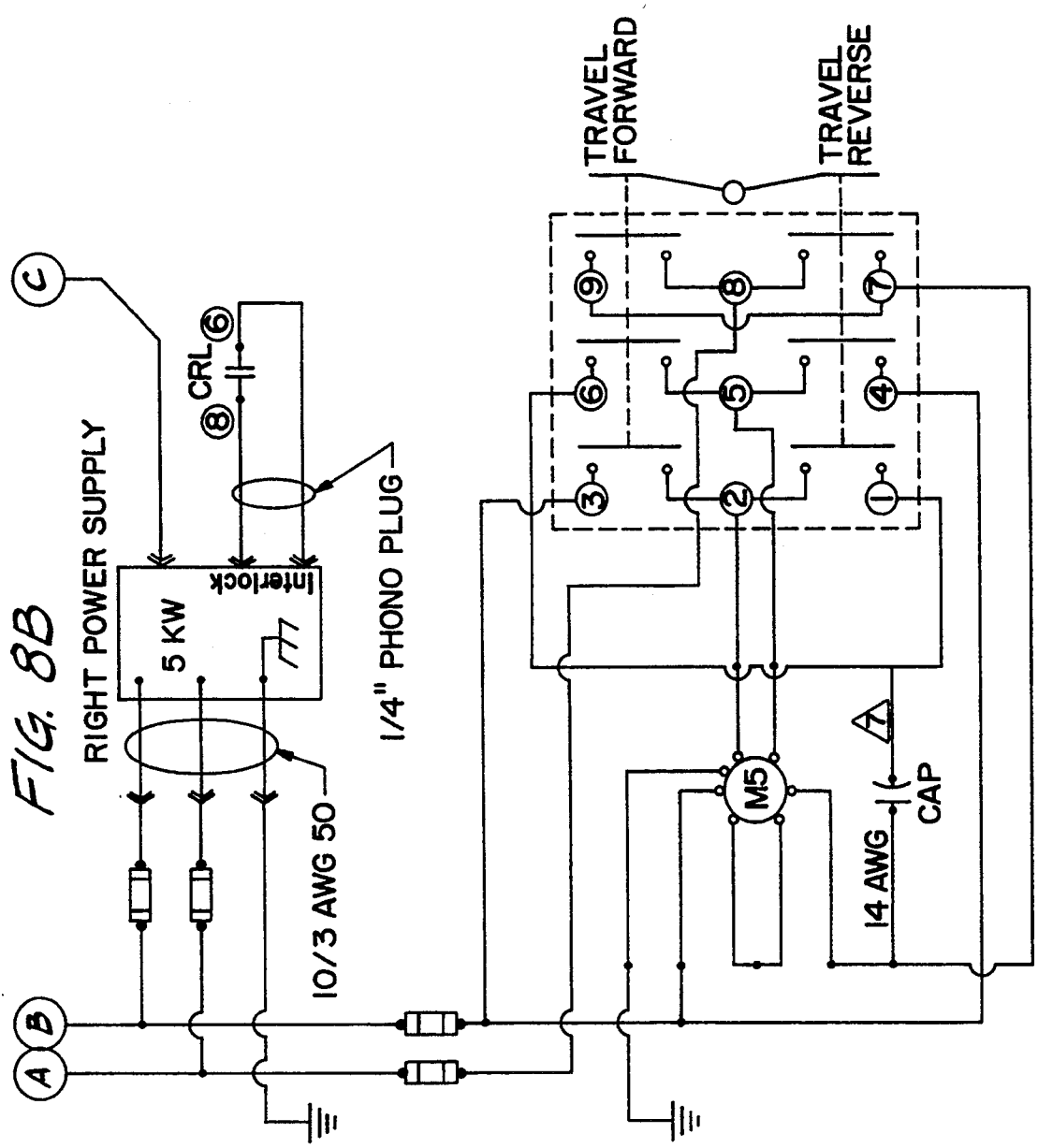

Referring now to the drawings, and more particularly to FIGS. 1 and 2, apparatus of the present invention is designated in its entirety by the reference numeral 1. This apparatus is similar in many respects to the apparatus described in U.S. Pat. No. 4,423,955, which is incorporated herein by reference. Apparatus 1 is designed for the automated exposure of photosensitized lithographic plates, which have a light-sensitive coating on one surface thereof and which are widely used in newspaper, book and magazine printing, to light through films (typically photographic negatives of pages to be printed) and through masks (typically photographic negatives which overly the films and which carry images common to many of the pages to be printed). It will be understood, however, that this invention may be embodied in apparatus and method for exposing other photosensitized plates, and apparatus and method in which films which are positives may be used instead of negatives.

As shown in FIG. 1, apparatus 1 has an infeed (left) end and an outfeed (right) end, movement of plates through the machine being from left to right in what may be referred to as a "forward" direction. In general, apparatus 1 comprises a first carriage 3, which may be referred to as an infeed or delivery carriage, having vacuum grippers 5 for picking up plates, one at a time, from a stack of plates, each designated P, held on a table 7 at the infeed end of the apparatus, and vacuum grippers 9 for picking up films (each designated F) and masks (each designated M), one at a time, from a stack of films and masks held in a tray 11 above and offset rearward from the table. The masks are interleaved with the films according to the number of plate exposures to be effected per mask. It will be understood in this regard that one film is typically used for each plate exposed, but that a single mask is often used for multiple exposures. For example, a single mask may be used for ten exposures involving ten plates and ten films. In this example, the mask and film stack would be arranged to have one mask, followed by ten films, followed by one mask, etc.

The carriage 3 is movable by suitable means (such as the air-operated cable cylinders, each designated 21 in FIG. 2, and associated elements more fully described in U.S. Pat. No. 4,423,955) along rails 23 at opposite sides of the apparatus to carry a picked-up mask M from its tray 11, to an exposure station 27 and to deposit the mask on a support in the form of a platen 29, and then to return for pick up of a plate from the plate stack and a film from the mask and film stack for conveyance to the exposure station. The construction and operation of the carriage 3 and its associated vacuum grippers 5, 9 is essentially identical to that disclosed in U.S. Pat. No. 4,423,955. Apparatus 1 typically includes only one exposure line, not two, since masks are typically used with double-wide plates and double-wide films, the result being that there is typically only one stack of plates and one stack of masks and films. Reference may be made to the aforesaid patent for further details regarding the construction and operation of the carriage 3, its associated vacuum grippers, the plate-holding table, and the film-holding tray.

A vacuum frame 31 with a window 33 is movable up and down at the exposure station 27 by suitable means, such as a pair of air-operated cable cylinders (only one shown in FIG. 1 at 34) as more fully described in the aforementioned U.S. Pat. No. 4,423,955, between a raised position in which the window is spaced above the platen 29, and a lowered position in which the window is engageable with a mask delivered to the exposure station and placed on the platen by the carriage 3. The frame 1 has vacuum cups 35 thereon for vacuum gripping the mask to the lower face (bottom) of the window 33 so that the mask is lifted up by the vacuum frame as it moves to its raised position, after which the carriage 3 is operable to deliver a plate and film to the exposure station and to deposit them, plate first, in superposed relation on registration pins 37 (FIG. 2) projecting up from the platen 29. The window 33 is then movable down to its lowered position to place the mask in a position overlying the film and in registration therewith. The vacuum frame 31 seals against the platen 29 around the superposed plate, film and mask. A vacuum is drawn in an exposure chamber defined by the vacuum frame, causing the window 33 to be forced down by atmospheric pressure on the mask, film and plate for exposure of the plate to light through the overlying window, mask and film. The construction and operation of the vacuum frame 31, platen 29 and associated parts is substantially identical to that described in U.S. Pat. No. 4,423,955, except that vacuum cups 35 on the vacuum frame (instead of grooves in the window) are used to grip the mask to the window.

Apparatus 1 further comprises a second carriage, generally designated 41, which may be referred to as an outfeed or discharge carriage, movable on rails 23 from a forward or "home" position (shown in phantom lines in FIG. 3) at the outfeed end of the apparatus, to a rearward position (shown in solid lines in FIG. 3) at the exposure station 27 for picking up a film F, a plate P and a mask M (if necessary) after an exposure has been completed, and then back to its stated forward position. The construction of this carriage 41 is similar to that of the discharge carriage described in U.S. Pat. No. 4,423,955, a major difference being that the carriage 41 of the present invention has three sets of vacuum grippers, not two as described in the prior patent. The discharge carriage 41 of this invention has film discharge gripper means comprising a plurality of (e.g., four) vacuum grippers each generally designated 45, movable up and down on the discharge carriage and operable to grip a film F overlying a plate P on the platen 29, plate discharge gripper means comprising a plurality of (e.g., four) vacuum grippers, each generally designated 47, movable up and down on the discharge carriage and operable to grip a plate on the platen, and mask discharge gripper means comprising a plurality of (e.g., four) vacuum grippers, each generally designated 49, movable up and down on the discharge carriage and operable to grip a mask which is vacuum gripped by the vacuum frame 31 on the bottom of the window 33.

As best illustrated in FIG. 7, the plate discharge grippers 47 (only one of which is shown) are mounted at the forward (right) end of the discharge carriage 41. Each of these grippers 47 comprises an air cylinder 51 mounted in vertical position head end up and rod end down on the lower flange of a beam 55 affixed to the front flange of a channel part 57 of the carriage 41. The film discharge grippers 45 are mounted immediately rearward (to the left) of the plate discharge grippers 47, and each comprises an air cylinder 59 mounted in vertical position head end up and rod end down on a bracket 61 affixed to the beam 55. The mask discharge grippers 49 are mounted directly above the plate discharge grippers 47, and each comprises an air cylinder 65 mounted in vertical position head end down and rod end up on the upper flange of the beam 55 on the carriage 41. The rod ends of the air cylinders of the various grippers carry suction cups, each designated 67, connected to flexible vacuum lines (not shown) for drawing a vacuum in the cups, the rod ends of the air cylinders being extensible and retractible for moving the suction cups up and down.

It is preferred that the film discharge grippers 45 raise the film F to a height somewhat greater than the height to which the plate P is raised by the plate discharge grippers 47 (e.g., one inch vs. two inches; see FIG. 4). This maintains a desirable separation between the film and plate so they do not cling together (on account of static electricity). To ensure such separation and to reduce static cling forces, an air jet 71 is mounted on the forward end of the carriage 41 for blowing air in a rearward direction between the film and plate, operation of the jet being initiated immediately prior to pickup of the plate and continuing until the discharge carriage begins movement back to its home position.

Means generally indicated at 81 (FIG. 2) is provided for operating the discharge carriage 41, air jet 71, and the discharge film, plate and mask grippers 45, 47, 49 as follows:

1. after a plate P has been exposed, and after the mask M overlying the film and plate has been raised by the vacuum frame 31, means 81 is operable to move the discharge carriage 41 from its forward or home position (phantom lines in FIG. 3) to its rearward position (solid lines in FIG. 3) between the platen 29 and the raised vacuum frame 31, the film and plate discharge grippers 45, 47 being in a raised position and the mask discharge grippers 49 being in lowered position as this occurs;
2. to lower the film discharge grippers 45 and actuate them (i.e., draw a vacuum in suction cups 67) to grip the film F overlying the plate P on the platen 29;
3. to raise the film discharge grippers 45 to lift the forward end of the film;
4. to move the carriage 41 a short distance (e.g., two inches) rearwardly while the film is gripped by the film grippers 45 thereby to expose a forward end portion of the plate below the film (the flexible film buckles and/or slides rearwardly to expose the plate; see FIG. 4),
5. to initiate operation of the air jet 71 to blow air between the film and plate, and substantially simultaneously to lower the plate discharge grippers 47 and actuate them (i.e., draw a vacuum in vacuum cups 67) to grip the exposed portion of the plate on the platen (FIG. 5);
6. to raise the plate discharge grippers 47 to lift the forward end of the plate P;
7. if the mask M gripped to the bottom of the window 33 is to be discharged from the exposure station 27, to raise the mask discharge grippers 49 substantially simultaneously with step 5, to actuate the mask discharge grippers (i.e., draw a vacuum in vacuum cups 67) to grip the mask on the bottom of the window, and to lower the mask discharge grippers 49, generally simultaneously with release of the vacuum holding the mask on the window to allow the mask to drop down and drape over the rear of the carriage (see FIG. 6);
8. to move the discharge carriage 41 forward to its forward (home) position, carrying the exposed plate, film and mask (if necessary) along with it; and
9. to deactuate the grippers 45, 47, 49 to release the film, plate and mask (if necessary) in a sequence to be described below.

Means 81 comprises a pneumatic system for moving the discharge carriage 41 rearward and forward on the rails 23. The operation of this system is similar to that described in U.S. Pat. No. 4,423,955 except that a rodless cylinder 83 (FIG. 2) is used to move the carriage, and a pneumatic brake system associated with the rodless cylinder is used to stop the carriage 41 at its two positions at the exposure station 27. The rodless cylinder 83 and brake may be of the type commercially available under the trademark "Tran-Sair" from Mosier Industries, Inc. of Brookville Ohio. Means 81 further comprises various valves, limit switches and pneumatic circuitry controlled by a programmable logic controller (PLC).

In moving to its forward ("home") position, the discharge carriage 41 carries the exposed plate P, film F and mask M (if necessary) to be discharged out of the exposure station 27. When the carriage reaches its forward position, the vacuum grip on the plate P is released, and the plate drops onto the upper reach of an exit belt conveyor 91 which feeds the plate P out the forward (exit) end of the apparatus and onto a second belt conveyor 93 (which may be referred to as a first predetermined location) for delivery to a plate processor (not shown). The exit conveyor 91 is driven by a reversible motor 95. The rearward end of this conveyor 91 is spaced forward of the forward edge of the platen 29, so that there is a drop space or passage between them, as indicated at 97. After the plate has moved off the exit conveyor 91, the vacuum grip on the film F is released, allowing the film to drop onto the exit conveyor 91. The film moves forward until its rearward (trailing) edge is forward of the passage 97 between the conveyor and platen, at which time the reversible motor 95 reverses the direction of the conveyor 91 to feed the film through the passage. Films falling through the passage 97 drop onto a film return conveyor 99 which extends under the platen 29 toward the infeed end of the apparatus and which delivers the films to a tray 101 (which may be regarded as a second predetermined location). This conveyor 99 is driven by a motor 103. After the film has dropped through the passage, the vacuum grip on the mask M is released. Extending up from the rear flange of channel part 57 of the carriage 41 is a support 109 (FIG. 7) for a mask discharge chute 111 for discharge of masks down at the rear of the discharge carriage 41 through the drop space 97. The mask chute 111 slopes downwardly and rearwardly from a top plate 115 mounted on the support 109. Air nozzles 117 (FIG. 1) of the type described in U.S. Pat. No. 4,423,955 may be used for blowing a mask M released from the mask grippers 49 rearward so it slides down the chute 111 and falls through the passage 97 for conveyance to tray 101.

Figure 8C:
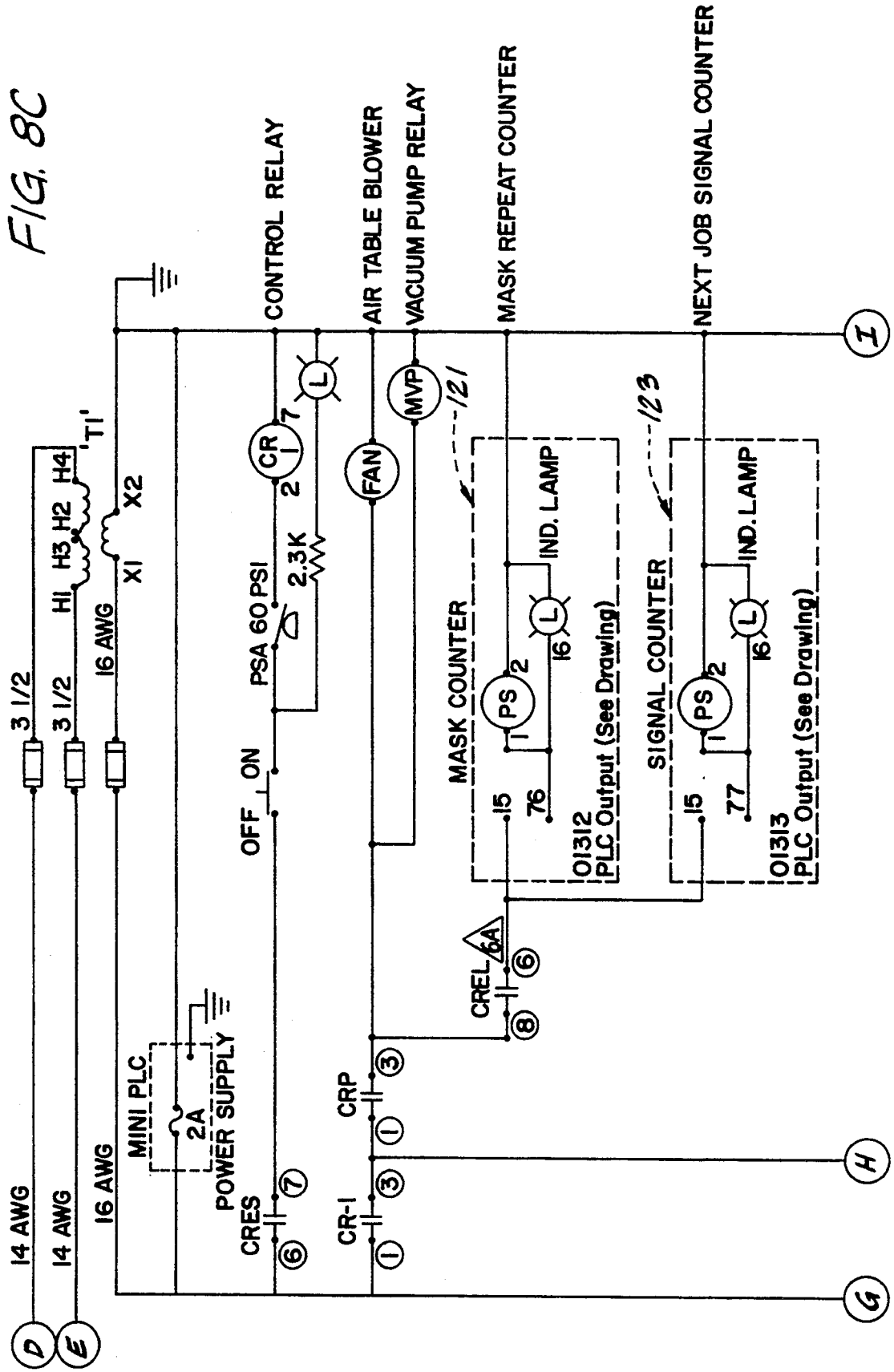
Figure 8D:
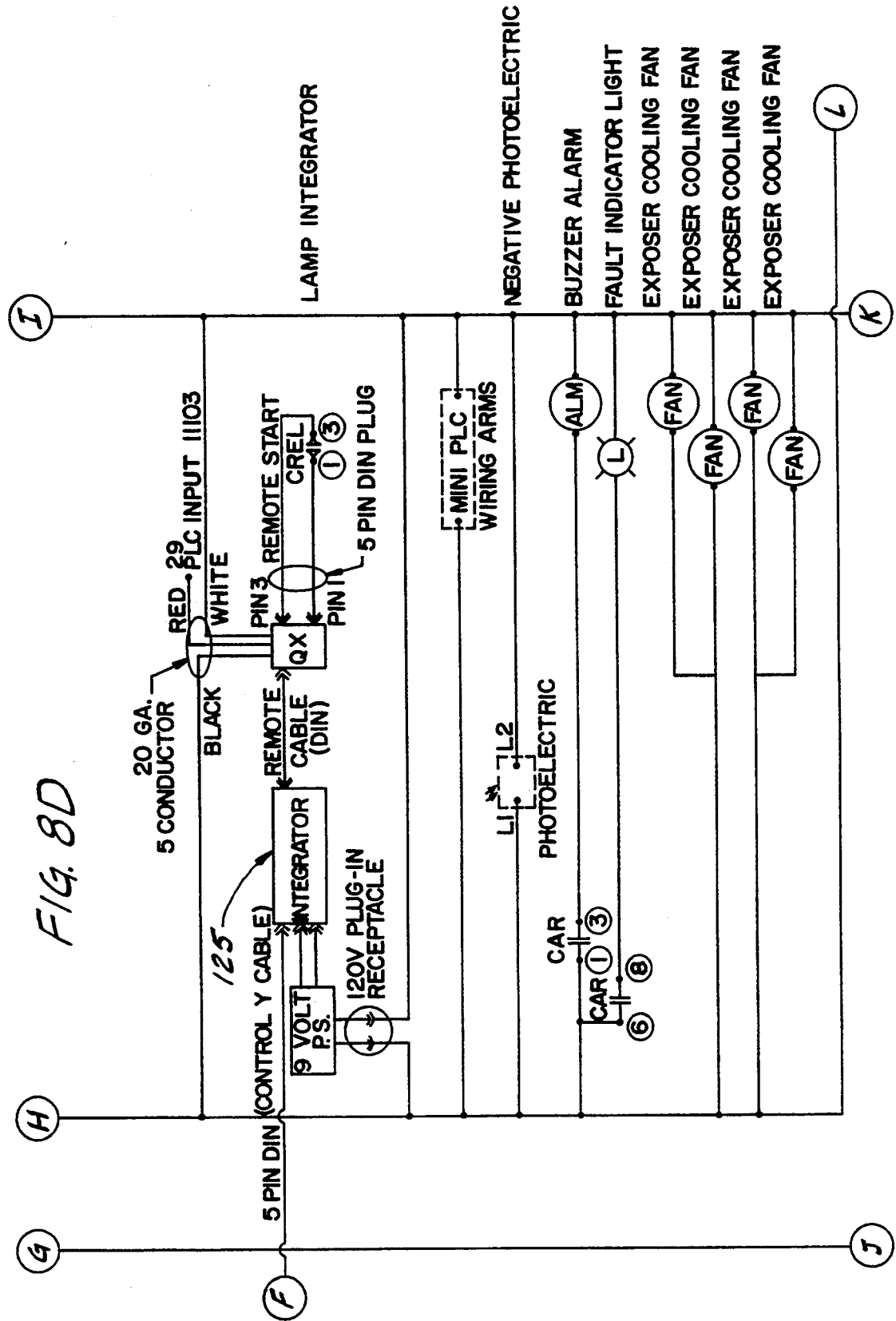

The circuitry for controlling the operation of the apparatus is shown in FIGS. 8A–8I. Inputs 1–34 to the PLC can be described as follows (see FIG. 8F and 8G):

Input 1—a signal from a "process" pushbutton switch to the PLC causes all components of the apparatus to move to their "home" (start) positions, and initiates operation of the apparatus.

Input 2—a signal from a "cancel" pushbutton switch causes all components to move to their "home" positions, and stops operation of the machine.

Input 3—a signal from a "load plate" pushbutton switch causes the infeed carriage 3 to move to the exposure station 29 to permit loading of plates P on the table and film/masks in the tray.

Input 4—a signal from a "pickup position" limit switch indicates that the infeed carriage 3 is in its home position (at the infeed end of the apparatus) and ready to pick up plates and films.

Input 5—a signal from a "plate pickup" reed switch indicates that the plate pick-up grippers 5 on the infeed carriage 3 have picked up a plate and that the carriage is ready to travel to the exposure station 27.

Input 6—a signal from a "negative pickup" reed switch indicates that the film pick-up grippers 9 on the infeed carriage 3 have picked up a film.

Input 7—a signal from a "plate proximity" switch indicates that there are plates P on the table 7.

Input 8—a signal from a "load/unload mask" pushbutton switch indicates that a mask M is to be delivered to the exposure station 27 for use with the next plate and film.

Input 9—a signal from a photoelectric switch indicates that there are films and/or masks in the tray 11.

Input 10—a signal from a "1 or 2 burn" switch indicates whether a film F is to be used for one or two plates P.

Input 11—a signal from a "vacuum frame up" limit switch indicates that the vacuum frame 31 is in its raised position.

Input 12—a signal from a "vacuum frame down" limit switch indicates that the vacuum frame 31 is in its lowered position.

Input 13—a signal from a "plate register" limit switch indicates that the infeed carriage 3 has arrived at its plate release position at the exposure station 27.

Input 14—a signal from a "negative register" limit switch indicates that the infeed carriage 3 has arrived at its film release position at the exposure station 27.

Input 15—a signal from a "print vacuum" switch indicates that the desired vacuum (e.g., 18" of mercury) has been developed in the exposure chamber defined by the vacuum frame 31 when the frame is in its lowered position prior to exposure of a plate.

Input 16—a signal from a mask counter 121 (FIG. 8C) indicates that the counter has started to increment (one increment per exposure operation) up to a "final count", which is a number preselected by the operator corresponding to the number of exposures for which a single mask is to remain at the exposure station (e.g., if one mask is to be used for 30 plates, the "final count" is 30).

Input 17—This signal from a signal counter 123 indicates that a preset "operator signal" count has been reached, the "operator signal" count being a predetermined number of exposures somewhat less than the "final count" number (e.g., 28 vs. 30).

Input 18—this signal from the mask counter 121 indicates that the "final count" has been reached.

Input 19—this signal from the signal counter 123 indicates that the "operator signal" count has been reached.

Input 20—a signal from an integrator 125 (FIG. 8D) indicates that a lamp (or lamps) is ready to be used for an exposure of a plate at the exposure station.

Input 21—a signal from an "exit transport film" limit switch indicates that the discharge carriage 41 has arrived at its film pickup position at the exposure station 27.

Input 22—a signal from an "exit transport plate" limit switch indicates that the discharge carriage 41 has arrived at its plate pickup position at the exposure station 27.

Input 23—a signal from an "exit transport park" limit switch indicates that the discharge carriage 41 has arrived at its "home" position.

Input 24—a signal from a "door interlock" limit switch indicates that a door on the apparatus is open, and the PLC signals for stoppage of operation.

Input 25—(spare input)

Input 26—a signal from a "negative tray" limit switch indicates that the film tray 11 is in its loaded (home) position.

Input 27—(spare input)

Input 28—a signal from a "magazine cover interlock" indicates that a safety cover for the film tray 11 is not in place, and the PLC signals stoppage of operation.

Input 29—a signal from a "mask vacuum" sensor switch indicates the absence of a vacuum in the suction cups 35 for holding a mask M on the window 33 (if the PLC receives this signal at a time when a mask should be on the window, indicating that the mask has dropped off the window, or that the vacuum frame 31 has failed to pick up the mask, then the PLC signals for stoppage of operation).

Input 30—a signal from an "exit film vacuum sensor" switch indicates the absence of a vacuum in the film grippers 45 on the discharge carriage 41 (if the PLC receives this signal at a time when a film should be gripped by such grippers 45, indicating that the film has dropped off the carriage 41, or that the grippers have failed to pick up the film, then the PLC signals for stoppage of operation).

Input 31—a signal from an "exit plate vacuum sensor" switch indicates the absence of a vacuum in the plate grippers 47 on the discharge carriage 41 (if the PLC receives this signal at a time when a plate should be gripped by such grippers, indicating that the plate has dropped off the carriage, or that the grippers have failed to pick up the plate, then the PLC signals for stoppage of operation).

Inputs 32–34—a signal from any of these interlocks indicates that there is a problem with the plate processing line downstream from the exposer apparatus 1, and the PLC signals for stoppage of operation.

Outputs A-AG from the PLC can be described as follows (see FIGS. 8H and 8I):

Output A—signals the cylinders 21 to move the infeed carriage 3 to its home position.

Output B—signals the cylinders 21 to move the infeed carriage 3 to the exposure station 27.

Output C—signals to actuate cylinders 34 to move the vacuum frame 31 to its lowered position.

Output D—signals the rodless cylinder 83 to move the discharge carriage 41 to the exposure station.

Output E—signals for the extension of the registration pins 37 at the exposure station.

Output F—signals for the extension of a mechanical stop to stop the infeed carriage 3 in its plate release position at the exposure station.

Output G—signals the plate grippers 5 on the infeed carriage 3 to pick up a plate from the table 7.

Output H—signals the film grippers 9 on the infeed carriage 3 to pick up a film from the tray 11.

Output I—signals the plate and mask grippers 47, 49 on the discharge carriage 41 to pick up a plate and mask (if necessary).

Output J—signals actuation of the air jets 117 to blow air.

Output K—signals to relieve the vacuum in the exposure chamber of the vacuum frame 31 after a plate P has been exposed and prior to the window 33 being raised.

Output L—signals for the drawing of a vacuum in the suction cups of the plate grippers 5 on the infeed carriage 3.

Output M—signals for the application of the brake associated with the rodless cylinder 83 to stop the discharge carriage 41.

Output N—signals for the drawing of a vacuum in the suction cups of the film grippers 9 on the infeed carriage 3.

Output O—signals for the drawing of a vacuum through holes in the platen 29 and prepunched holes in a plate on the platen to hold the film F down when the vacuum frame 31 lifts off from the platen carrying a mask M.

Output P—signals for the drawing of a vacuum through holes in the platen 29 to hold the plate P down when the vacuum frame 31 lifts off from the platen carrying a mask M.

Output Q—signals to actuate air jet 71 for separating the film and plate during the discharge sequence at the exposure station.

Output R—signals for the drawing of a vacuum in the suction cups 35 for gripping a mask to the bottom of the window 33.

Output S—signals the film grippers 45 on the discharge carriage 41 to pick up a film at the exposure station 27.

Output T—signals for the drawing of a vacuum in the exposure chamber of the vacuum frame.

Output U—signals for the drawing of a vacuum in the suction cups of the plate grippers 47 on the discharge carriage 41.

Output V—signals for the drawing of a vacuum in the suction cups of the film grippers 45 on the discharge carriage 41.

Output W—signals for the drawing of a vacuum in the suction cups of the mask grippers 49 on the discharge carriage 41.

Output X—signals that the machine is ready for operation.

Output Y—signals that doors, covers, etc. are closed and that safety features are in place.

Output Z—signals the exit conveyor 91 to run in a forward feed direction.

Output AA—signals the mask counter 121 to increment one count when an exposure has taken place at the exposure station.

Output AB—signals the signal counter 123 to increment by one when an exposure has taken place.

Output AC—signals that the integrator 125 is on.

Output AD—signals the exit conveyor 91 to run in a reverse feed direction.

Output AE—signals that battery power is low.

Output AF—signals that the plate table 7 is empty.

Output AG—signals an alarm if the plate supply is depleted.

It will be observed that the mask counter 121 is operable in conjunction with the PLC to control the sequence in which masks, plates and films are delivered to and discharged from the exposure station 27. This counter is preset by an operator to a "final count" number corresponding to the number of exposures per mask. The counter 121 automatically increments the count by one for each exposure operation up to and including the exposure corresponding to the "final count". Upon reaching the "final count", the counter sends a signal to the PLC indicating that the current exposure is the final exposure in the sequence, that the mask is to be discharged from the exposure station after the exposure operation is complete, and that a new mask is to be conveyed by the infeed carriage 3 to the exposure station for the next exposure. The counter automatically resets to one after the "final count" has been reached. Unless the "final count" number is changed for the next sequence, the counter automatically uses the same "final count" used in the previous sequence. The function of the signal counter 123 is to signal the operator (by means of a buzzer, for example) that the number of completed exposures is approaching the "final count", thus giving the operator sufficient advance notice to change the "final count", if desired, for the next sequence. The signal counter is typically set at a number one or two counts less than the "final count" number.

The listing of a program suitable for controlling the programmable logic controller PLC is attached as Appendix A.

Operation of apparatus 1 is as follows:

Generally, at the start of operations, the delivery or infeed carriage 3 is back at the infeed end of the machine as shown in FIG. 1, and the vacuum frame 31 is in its raised position at the exposure station 27. Further, masks M, films F and plates P are loaded in the apparatus, with the stack of films and masks arranged in a predetermined interleaved sequence according to need (e.g., if a different mask is needed every four plate exposures, every fifth sheet in the stack will be a mask, followed by four films). The operator should set the mask and signal counters 121, 123 to register suitable "final count" and "signal operator" numbers, so that during ensuing operation the programmable logic controller PLC can appropriately signal for the infeed carriage 3 to pick up either a mask or a film and plate for delivery to the exposure station 27.

Operation of the infeed carriage 3 to deliver a mask, film and plate to the exposure station is generally similar to the procedure described in U.S. Pat. No. 4,423,955, except that the carriage and associated vacuum grippers 5, 9 are operable, when necessary, to grip a mask M from the mask and film stack and to carry the mask forwardly to the exposure station. It will be understood in this regard that a mask will be delivered to the exposure station at the start of operation and at intervals thereafter depending on the count of the mask counter.

At the start of operation, the carriage 3 is operable to deliver a mask to the exposure station 27 and to deposit the mask on the platen 29. The vacuum frame 31 then moves to its lowered position, vacuum grips the mask via suction cups 35, and returns to its raised position, carrying the mask along with it. In the meantime, the carriage 3 returns to the infeed end of the apparatus to pick up a plate and a film, and then travels forward to the exposure station to deposit the plate and film on the platen 29 with the film overlying the plate and in registration therewith (registration being achieved by registration pins 37). After the plate and film are deposited, the vacuum frame 33 moves to its lowered position to bring the mask into overlying registration with the film and plate (the mask also has holes to receive the registration pins), and to seal against the platen 29. When in its lowered position, the vacuum frame seals against the platen around the plate, film and mask. A vacuum is then drawn in the exposure chamber (defined by the vacuum frame 31) through a set of grooves in the platen 29 so that atmospheric pressure forces the window down into pressure engagement with the mask, film and plate, as more fully described in U.S. Pat. No. 4,923,955. When a suitable vacuum has been drawn, exposure lamps are energized for an interval of time to expose the plate to light transmitted through the window, mask and film. The mask and signal counters 121, 123 increment by one immediately before, during or immediately after the exposure operation.

After a suitable exposure time has elapsed, the vacuum frame 31 and window 33 return to their raised position (carrying along the mask), which triggers the programmable logic controller PLC to initiate an exit sequence of steps as follows. The discharge carriage 41 is moved by operation of the rodless cylinder 83 from its home position rearwardly to the exposure station 27 to a film-pickup position in which the film grippers 45 overly the forward end margins of the film F (see FIG. 3). Upon reaching this position, the pneumatic brake of the rodless cylinder 83 is actuated to brake the carriage 41 to a stop. In accordance with a timing sequence, the film discharge grippers 45 are then actuated to pick up the forward end of the film, whereupon the brake is released to permit the carriage to move rearwardly a relatively short distance to a plate pick-up position in which the plate grippers overly an exposed forward portion of the plate (FIG. 4). The carriage 41 is braked to a stop at this position, which signals initiation of another timing sequence. At the start of this sequence, air jet 71 is actuated to blow air between the raised front end of the film and the plate, and the plate grippers 47 are actuated to pick up the plate. If the mask held by the vacuum frame 31 is to be discharged from the exposure station 27 (as indicated by the mask counter 121), the sequence also involves extension of the mask grippers 49 to grip the forward end of the mask, retraction of the mask grippers and a substantially simultaneous release of the vacuum drawn by the suction cups 35 to permit the mask to drop down onto the chute 111 of the discharge carriage 41.

Following completion of the latter timing sequence, air jet 71 is deactuated, the brake of the rodless cylinder 83 is released, and the discharge carriage 41 is moved forward by the rodless cylinder to its home position. Upon arrival, the plate discharge grippers 47 are deactuated (the vacuum to the suction cups 67 is relieved) to release the plate onto the exit conveyor 91 which is operating in a forward feed direction. After a predetermined interval of time sufficient to permit exit of the plate off conveyor 91 and onto conveyor 93, the film discharge grippers 45 are deactuated to release the film to drop onto the exit conveyor 91 for conveyance in a forward direction. After a predetermined interval of time sufficient to enable the rear edge of the film to move forward past the drop space 97, the exit conveyor motor 95 is signalled to reverse direction so that the exit conveyor 91 (which is an endless belt) feeds the film rearwardly back to the passage 97 so that it drops through the passage onto the return conveyor 99 therebelow for return to the infeed end of the apparatus. After a predetermined time delay following release of the film (this delay should be sufficient to permit the film to drop through passage 97), the mask discharge grippers 49 are deactuated to release the mask (assuming one is being carried by the discharge carriage 41), and the air jets 117 are actuated to blow air on the released mask for their assured discharge through the drop space 97 and onto the return conveyor 99 for return to the infeed end of the machine. It will be understood, therefore, that films and masks are returned to the infeed end of the machine and loaded into tray 101 in the same sequence they are used.

Assuming that the mask counter 121 has not reached its "final count" (indicating that a different mask is to be delivered to the exposure station for the next exposure), the infeed carriage 3 operates to deliver a film and unexposed plate to the exposure station 27 at the same time that the discharge carriage 41 travels forward from the exposure station to its home position carrying the film and plate exposed in the previous exposure operation (the discharge carriage does not carry the mask in this situation because the mask is to be used in the next exposure). If the mask counter 121 has reached its "final count", indicating that a different mask is to be used for the next set of exposures, the infeed carriage 3 must make two trips, the first to pick up a new mask for the next exposure operation, and the second to pick up a film and unexposed plate. In either event, travel of the infeed carriage 3 back to its home position at the infeed end of the machine takes place as the discharge carriage 41 travels rearwardly to the exposure station 27 to minimize wasted time and maximize efficiency.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

```
+----------------------------------------------------------------+
|                                                                |
|                                                                |
|                      Allen-Bradley Co.                         |
|                      6200 Series Software                      |
|              PLC-2 Programming Terminal Software               |
|                         Release 3.0                            |
|                        Program Listing                         |
|                                                                |
|                         R.R. DONNELY                           |
|                                                                |
|                    Processor Name: 113866                      |
|                                                                |
|                                                                |
+----------------------------------------------------------------+
```

R.R. DONNELY  
Ladder Listing     Processor Name: 113866     Page 1  Rung M:0
```
Rung M:0
|
+---------------------------------START OF PROGRAM-----------------------------
|
```
Rung M:1
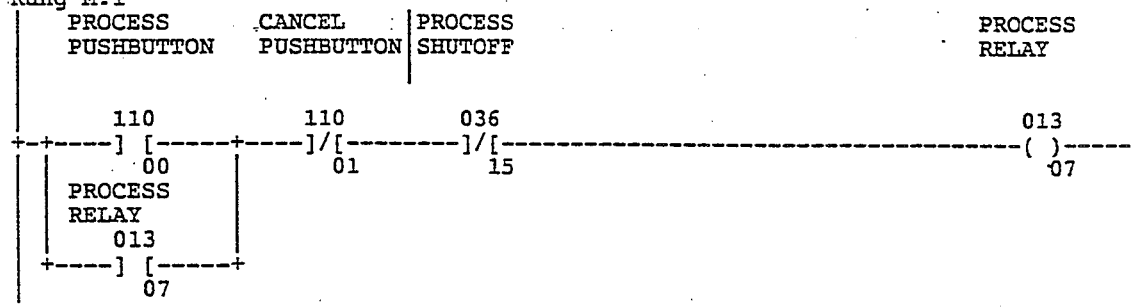
Rung M:2
Rung M:3
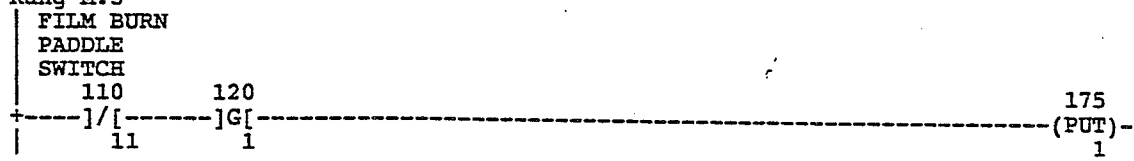
Rung M:4
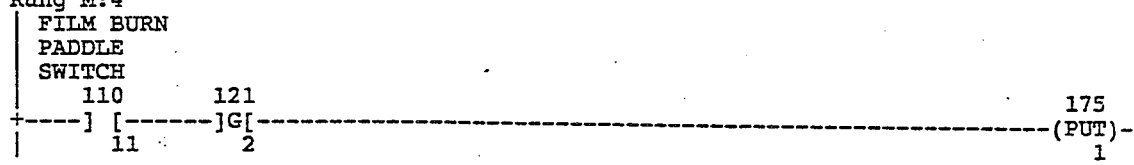
Rung M:5
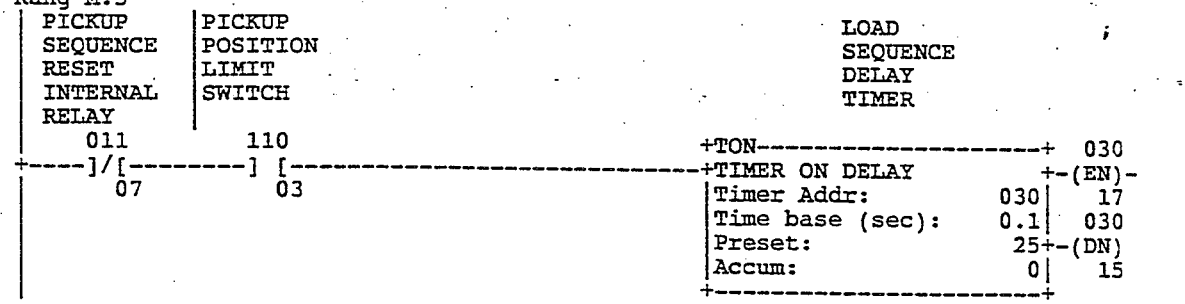
Rung M:6

```
Rung M:7
 | MASK              PICKUP         LOAD         LOAD
 | LOAD              POSITION       FILM         FILM
 | COMPLETE          LIMIT          ONLY         ONLY
 |                   SWITCH         COMPLETE     COMPLETE
 |   010       015     110    015      010          010
+-+----] [------] [------] [------]/[--+----]/[------------------------( )-----
 |    05        15       03       16   |    07                            06
 | INHIBIT                              |
 | PLATE                                |
 | PICKUP                               |
 |   015                                |
 +----] [-----------------------------+ |
 |    11                                |
 | LOAD                                 |
 | FILM                                 |
 | ONLY                                 |
 |   010                                |
 +----] [-----------------------------+
 |    06

Rung M:8
 | LOAD            MASK           DLC
 | FILM            LOAD           COUNTER
 | ONLY            COMPLETE       DELAYED
 |   010     015     010           111                                       015
+-+----] [------] [------] [-----+----]/[------------------------------------( )--
 |    06       15       05       |    01                                      16
 |   015                         |
 +--] [--------------------------+
 |    16

Rung M:13
 |  LOAD           NEGATIVE      LOAD     |EMPTY       |PLATE LOAD|EMPTY
 |  SEQUENCE       VACUUM ON     FILM     |PLATE       |VACUUM    |PLATE
 |  DELAY          INTERNAL      ONLY     |STATION     |OFF       |ALARM
 |  TIMER          RELAY                  |INTERNAL    |INTERNAL  |SEQUENCE
 |                                        |RELAY       |RELAY     |INT. RELAY|
 |    030            021          010         010         010        016      >
+-+----]G[------]=[------] [-----+----]/[---------]/[---------]/[---------]/[------>
 |     0           20      01    |    06          04          15          02      >
 |  PLATE                        |
 |  VACUUM ON                    |
 |  INTERNAL                     |
 |  RELAY                        |
 |    010                        |
 +----] [------------------------+
 |    03

|PLATE
                                                                   |VACUUM
                                                                   |ON
                                                                   |INTERNAL
                                                                   |RELAY
                                                                   <   010
                                                                   <---( )-----
                                                                   <    03

Rung M:14
 |  LOAD           PLATE                                              EMPTY
 |  SEQUENCE       PROXIMITY                                          PLATE
 |  DELAY          SWITCH                                             STATION
 |  TIMER                                                             INTERNAL
 |                                                                    RELAY
 |    030            021          110                                   010
+-----]G[----------]=[---------]/[------------------------------------( )-----
 |     0             20           06                                    04
```

```
Rung M:15
 | NEGATIVE                                                                                        VSV-2
 | VACUUM ON                                                                                       NEGATIVE
 | INTERNAL                                                                                        VACUUM
 | RELAY                                                                                           CUPS
 |   010                                                                                            012
 +----] [--------------------------------------------------------------------------------------------( )-----
 |    01                                                                                             15

Rung M:16
 | PLATE                                                                                           VSV-1
 | VACUUM ON                                                                                       PLATE
 | INTERNAL                                                                                        VACUUM
 | RELAY                                                                                           CUPS
 |   010                                                                                            012
 +----] [--------------------------------------------------------------------------------------------( )-----
 |    03                                                                                             13

Rung M:17
 | PLATE          LOADER        PICKUP      EMPTY                                                  END OF
 | VACUUM ON      SEQUENCE      POSITION    PLATE                                                  CYCLE
 | INTERNAL      |TIMER         LIMIT       ALARM                                                  INTERNAL
 | RELAY         |ON DELAY      SWITCH      SEQUENCE                                               RELAY
 |                                          INT. RELAY
 |   010          010            030         110          016                                       010
 +----]/[-------]/[-----] [---------] [---------]/[---------------------------( )-----
 |    03          01             15          03           02                                         11

Rung M:18
 | REGISTER      |VACUUM        SV-3        END OF                                                 LOAD
 | SEQUENCE     |FRAME UP      EXIT         CYCLE                                                  REGISTER
 | INTERNAL     |LIMIT         TRANSPORT    INTERNAL                                               POSITION
 | RELAY        |SWITCH        FORWARD      RELAY                                                  INTERNAL
 |                                                                                                 RELAY
 |   010          110           012          010                                                    016
 +----] [---------] [---------]/[---------]/[-----------------------------------------( )-----
 |    12           12            03           11                                                     01

Rung M:19
 |   LOADER      |PLATE         NEGATIVE     END OF       EMPTY                                    REGISTER
 |   SEQUENCE    |PICKUP        PICK UP      LOAD         PLATE                                    SEQUENCE
 |   TIMER       |CYLINDER      CYLINDER     CYCLE        ALARM                                    INTERNAL
 |   ON DELAY    |UP LIMIT      UP LIMIT     INTERNAL     SEQUENCE                                 RELAY
 |               |SWITCH        SWITCH       RELAY        INT. RELAY
 |     030         110           110          010          016                                      010
 +-+----] [---------] [---------] [-----+----]/[---------]/[------------------( )-----
 | |    15           04            05    |     16           02                                      12
 | | REGISTER                            |
 | | SEQUENCE                            |
 | | INTERNAL                            |
 | | RELAY                               |
 | |   010                               |
 | +----] [-----------------------------+
 |      12

Rung M:20
 | REGISTER      REGISTER       LOAD                                                               PLATE
 | SEQUENCE     |STOPS          FILM                                                               REGISTER
 | INTERNAL     |RETRACT        ONLY                                                               STOPS
 | RELAY        |INTERNAL                                                                          INTERNAL
 |              |RELAY                                                                             RELAY
 |   010          010            010                                                                016
 +----] [---------]/[---------]/[-----------------------------------------------------( )-----
 |    12           17            06                                                                  05
```

```
Rung M:21
     PLATE          |SV-1                                            LOAD
     REGISTER       |FEED                                            POSITION
     LIMIT          |TRANSFER                                        PINS UP
     SWITCH         |REGISTER                                        INTERNAL
                    |POSITION                                        RELAY
      110            012            013                               010
+-+----] [---------] [-----+---]/[------------------------------------( )-----
| |     14           01    |    02                                    13
| |    LOAD         |PROCESS
| |    POSITION     |PUSHBUTTON
| |    PINS UP      |
| |    INTERNAL     |
| |    RELAY        |
| |     010          110
| +----] [---------]/[-----+
| |     13           00    |
| |    LOAD         |LOADER
| |    POSITION     |INHIBIT
| |    PINS UP      |INTERNAL
| |    INTERNAL     |RELAY
| |    RELAY        |
| |     010          016
| +----] [---------] [-----+
|       13           12

Rung M:22
     REGISTER       |PLATE          |END OF                          PLATE
     SEQUENCE       |REGISTER       |LOAD                            REGISTER
     INTERNAL       |LIMIT          |CYCLE                           SEQUENCE
     RELAY          |SWITCH         |INTERNAL                        TIMER
                    |               |RELAY
      010            110             010                     +TON----------------------+ 031
+----] [---------] [---------]/[-----------------------------+TIMER ON DELAY           +-(EN)-
|     12            14           16                          |Timer Addr:         031|   17
|                                                            |Time base (sec):    0.1|  031
|                                                            |Preset:              25+-(DN)
|                                                            |Accum:                0|   15
|                                                            +------------------------+

Rung M:23
     PLATE          |PLATE          |LOAD                            PLATES
     REGISTER       |REGISTER       |FILM                            DOWN
     SEQUENCE       |SEQUENCE       |ONLY                            INTERNAL
     TIMER          |TIMER          |                                RELAY
      031            156             031           010                010
+-+----]G[--------]=[--+----]/[---------]/[---------------------------( )-----
| |    0           15  |   15           06                            14
| |   PLATES           |
| |   DOWN             |
| |   INTERNAL         |
| |   RELAY            |
| |    010             |
| +----] [-------------+
|       14

Rung M:24
     PLATE                                                           PLATE
     REGISTER                                                        LOAD
     SEQUENCE                                                        VACUUM OFF
     TIMER                                                           INTERNAL
                                                                     RELAY
      031            150                                              010
+----]G[---------]=[-------------------------------------------------( )-----
      0            20                                                 15
```

```
Rung M:25
| NEGATIVE   NEGATIVE   PLATE      NEGATIVE   VSV-1      VSV-2      END OF
| REGISTER   REGISTER   PICKUP     PICK UP    PLATE      NEGATIVE   LOAD
| SEQUENCE   LIMIT      CYLINDER   CYLINDER   VACUUM     VACUUM     CYCLE
| TIMER      SWITCH     UP LIMIT   UP LIMIT              CUPS       INTERNAL
|                       SWITCH     SWITCH                           RELAY
|    032        110        110        110       012        012        010
+----] [-------] [--------] [--------] [--------]/[--------]/[--------( )-----
|     15         15         04         05        13         15         16

Rung M:26
| END OF     LOAD                                                    LOAD
| LOAD       FILM                                                    FILM
| CYCLE      ONLY                                                    ONLY
| INTERNAL                                                           COMPLETE
| RELAY
|    010        010                                                     010
+----] [-------] [---------------------------------------------------( )-----
|     16         06                                                     07

Rung M:27
|    PLATE      PLATE      END OF                                    REGISTER
|    REGISTER   PICKUP     LOAD                                      STOPS
|    SEQUENCE   CYLINDER   CYCLE                                     RETRACT
|    TIMER      UP LIMIT   INTERNAL                                  INTERNAL
|               SWITCH     RELAY                                     RELAY
|      031        110        010                                        010
+-+----] [-------] [--------]/[----+----------------------------------( )-----
| |     15         04         16   |                                    17
| | LOAD                            |
| | FILM                            |
| | ONLY                            |
| |    010                          |
| +----] [--------------------------+
|        06

Rung M:28
| REGISTER   NEGATIVE                                          NEGATIVE
| STOPS      REGISTER                                          REGISTER
| RETRACT    LIMIT                                             SEQUENCE
| INTERNAL   SWITCH                                            TIMER
| RELAY
|    010        110                                     +TON--------------------+  032
+----] [-------] [-------------------------------------+TIMER ON DELAY       +-(EN)-
|     17         15                                    |Timer Addr:      032|   17
|                                                      |Time base (sec): 0.1|  032
|                                                      |Preset:           25+-(DN)
|                                                      |Accum:             0|   15
|                                                      +----------------------+

Rung M:29
|    NEGATIVE         NEGATIVE                                 NEGATIVE
|    REGISTER         REGISTER                                 DOWN
|    SEQUENCE         SEQUENCE                                 INTERNAL
|    TIMER            TIMER                                    RELAY
|      032     151      032                                      011
+-+----]G[-------]=[--+----]/[----------------------------------( )-----
| |     0         5   |     15                                   00
| | NEGATIVE          |
| | DOWN              |
| | INTERNAL          |
| | RELAY             |
| |    011            |
| +----] [------------+
|        00
```

```
Rung M:30
  NEGATIVE                                                                       NEGATIVE
  REGISTER                                                                       LOAD
  SEQUENCE                                                                       VACUUM OFF
  TIMER                                                                          INTERNAL
                                                                                 RELAY
     032       152                                                                  011
+----]G[-------]=[---------------------------------------------------------------( )-----
|      0        25                                                                   01

Rung M:31
    END OF       VACUUM      RESET                                               PRINT
    LOAD         FRAME       PRINT                                               SEQUENCE
    CYCLE        UP DELAY    SEQUENCE                                            INTERNAL
    INTERNAL     TIMER                                                           RELAY
    RELAY
     010          034         011                                                  011
+-+----] [------+----]/[---------]/[---------------------------------------------( )-----
| |    16       |     15          04                                                02
| |  PRINT      |
| |  SEQUENCE   |
| |  INTERNAL   |
| |  RELAY      |
| |   011       |
| +----] [------+
|      02

Rung M:32
    DOOR         VACUUM                                                          VACUUM
    INTERLOCK    FRAME                                                           FRAME UP
    LIMIT        DOOWN                                                           SAFETY
    SWITCH       LIMIT                                                           INTERNAL
                 SWITCH                                                          RELAY
     111          110                                                              016
+----]/[---------]/[-------------------------------------------------------------( )-----
|     07          13                                                                04

Rung M:33
    PRINT       |VACUUM     |PICKUP       PICKUP      EXIT         |VACUUM
    SEQUENCE    |FRAME      |POSITION     POSITION    TRANSFER     |FRAME UP
    INTERNAL    |UP DELAY   |LIMIT        LIMIT       PARK         |SAFETY
    RELAY       |TIMER      |SWITCH       SWITCH      INTERNAL     |INTERNAL
                                                      L.S.         |RELAY
     011         034         110          110          111           016
+-+----] [---------]/[---------] [-----+----] [---------] [---------]/[--------------->
| |    02           15           03    |     03           06           04            >
| | VACUUM                             |
| | FRAME                              |
| | DOWN                               |
| | INTERNAL                           |
| | RELAY                              |
| |  016                               |
| +----] [-----------------------------+
|      06

|SV-2
                                                                              |VACUUM
                                                                              |FRAME
                                                                              |DOWN

<   012
                                                                              <---( )---
                                                                              <    02
```

```
Rung M:34
    PRINT          VACUUM         END                                                   VSV-9
    SEQUENCE       FRAME          EXPOSE                                                PRINT
    INTERNAL       DOWN           CYCLE                                                 VACUUM
    RELAY          LIMIT          INTERNAL                                              ON
                   SWITCH         RELAY
      011           110             011                                                  013
+-----] [----------] [----------]/[--------------------------------------------------( )-----
       02            13              10                                                  03

Rung M:35
    PLATE         |PLATES         PLATE                                                 PLATE
    VACUUM ON     |DOWN           PRINT                                                 EXPOSE
    INTERNAL      |INTERNAL       VACUUM OFF                                            VACUUM
    RELAY         |RELAY          INTERNAL                                              INTERNAL
                  |               RELAY                                                 RELAY
      010          010              011                                                  011
+-+-----] [----------] [-----+-----]/[-------------------------------------------------( )-----
  |      03           14     |       13                                                  03
  |    PLATE                 |
  |    EXPOSE                |
  |    VACUUM                |
  |    INTERNAL              |
  |    RELAY                 |
  |      011                 |
  +-----] [------------------+
           03

Rung M:36
    NEGATIVE      |NEGATIVE        LOAD /        |NEGATIVE                              NEGATIVE
    VACUUM ON     |DOWN            UNLOAD        |PRINT                                 EXPOSE
    INTERNAL      |INTERNAL        MASK          |VACUUM                                VACUUM
    RELAY         |RELAY           PUSHBUTTON    |INTERNAL                              INTERNAL
                  |                              |RELAY                                 RELAY
      010          011              110            011                                   011
+-+-----] [----------] [-----+-----] [----------]/[-----------------------------------( )-----
  |      01           00     |       07            14                                    05
  |    NEGATIVE              |
  |    EXPOSE                |
  |    VACUUM                |
  |    INTERNAL              |
  |    RELAY                 |
  |      011                 |
  +-----] [------------------+
           05

Rung M:37
    PLATE          PLATE         |PLATE /                                               VSV-3
    EXPOSE         REGISTER      |NEGATIVE                                              PLATE
    VACUUM         LIMIT         |VACUUM                                                EXPOSE
    INTERNAL       SWITCH        |DELAY                                                 VACUUM
    RELAY                        |TIMER
      011           110            047                                                   012
+-+-----] [-----+----]/[----------] [-------------------------------------------------( )-----
  |      03    |       14            15                                                  17
  |   VSV-5    |
  |   PRINT    |
  |   VACUUM   |
  |   ON       |
  |    013     |
  +-----] [----+
         03
```

```
Rung M:38
|    NEGATIVE       NEGATIVE                                              VSV-4
|    EXPOSE         VACUUM                                                NEGATIVE
|    VACUUM         DELAY                                                 EXPOSE
|    INTERNAL       INTERNAL                                              VACUUM
|    RELAY          RELAY
|      011            016                                                   013
+-+----] [------+----]/[----------------------------------------------------( )-----
| |      05     |     07                                                    01
| |   VSV-5     |                                                                    ;
| |   PRINT     |
| |   VACUUM    |
| |   ON        |
| |     013     |
| +----] [------+
|        03

Rung M:39
|    VACUUM        PLATE /                                                NEGATIVE
|    FRAME         NEGATIVE                                               VACUUM
|    DOWN          VACUUM                                                 DELAY
|    LIMIT         DELAY                                                  INTERNAL
|    SWITCH        TIMER
|      110           047                                                    016
+----] [-----------]/[------------------------------------------------------( )-----
|      13            15                                                     07

Rung M:40
|    NEGATIVE      PICK-UP                                     PLATE /
|    VACUUM        SEQUENCE                                    NEGATIVE
|    DELAY         RESET                                       VACUUM
|    INTERNAL                                                  DELAY
|    RELAY                                                     TIMER
|      016           011                                      +TON---------------------+  047
+-+----] [------+----]/[---------------------------------------+TIMER ON DELAY         +-(EN)-
| |     07      |     17                                       |Timer Addr:      047|    17
| |             |                                              |Time base (sec): 0.1|   047
| |             |                                              |Preset:           20+-(DN)
| |             |                                              |Accum:             0|   15
| |             |                                              +----------------------+
| |   PLATE /   |
| |   NEGATIVE  |
| |   VACUUM    |
| |   DELAY     |
| |   TIMER     |
| |     047     |
| +----] [------+
|        17

Rung M:41
|    PRINT                         END           LOAD
|    VACUUM                        EXPOSE        MASK
|    SWITCH                        CYCLE         CIRCUIT
|                                  INTERNAL
|                                  RELAY
|      110                           011           010                                    >
+-+----] [------------------------+--]/[---------]/[--------------------------------------->
| |     16                        |   10           02                                     >
| |                               |
| |                               |
| |   EXPOSURE      VACUUM        |
| |   DELAY         FRAME         |
| |   TIMER         DOWN          |
| |                 LIMIT         |
| |                 SWITCH        |
| |     041           110         |
| +----] [----------] [-----------+
|        17            13
```

```
                                                    DELAY
                                                    TIMER
                                        <-+TON---------------------+  041
                                        <-+TIMER ON DELAY          +-(EN)-
                                        < |Timer Addr:        041|   17
                                          |Time base (sec):   0.1|  041
                                          |Preset:             10+-(DN)
                                          |Accum:               0|   15
                                          +----------------------+

Rung M:42
     LOAD       |NEGATIVE    |VACUUM      |VSV-4        DLC
     MASK       |REGISTER    |FRAME UP    |NEGATIVE     COUNTER
     CIRCUIT    |LIMIT       |LIMIT       |EXPOSE       DELAYED
                |SWITCH      |SWITCH      |VACUUM
       010         110          110          013          111                    015
  +-+----] [---------] [---------] [---------]/[-----+----]/[-------------------( )--
  | |  02          15           12           01     |      01                        15
  |   015                                           |
  +--] [--------------------------------------------+
       15

Rung M:43
     LOAD       |PRINT       |VACUUM      |DLC          MASK
     MASK       |VACUUM      |FRAME       |COUNTER      LOAD
     CIRCUIT    |SWITCH      |DOWN        |DELAYED      COMPLETE
                             |LIMIT
                             |SWITCH
       010         110         015         110          111                      010
  +-+----] [---------] [-------] [-------] [-------+----]/[---------------------( )-----
  | |  02          16          15          13     |      01                          05
  |   MASK
  |   LOAD
  |   COMPLETE
  |     010
  +----] [------------------------------------------+
         05

Rung M:44
     LOAD       |MASK                                                        RESET
     MASK       |LOAD                                                        PRINT
     CIRCUIT    |COMPLETE                                                    SEQUENCE
       010          010                                                        011
  +----] [---------] [-----------------------------------------------------( )-----
         02           05                                                        04

Rung M:45
     VACUUM     |LOAD        |PRINT        MASK                              RESET
     FRAME UP   |MASK        |SEQUENCE     LOAD                              LOAD
     LIMIT      |CIRCUIT     |INTERNAL     COMPLETE                          MASK
     SWITCH                  |RELAY
       110         010          011          010                              011
  +-+----] [---------] [---------]/[------+----] [-------------------------( )-----
  | |  12           02          02       |      05                            06
  |   RESET
  |   LOAD
  |   MASK
  |    011
  +----] [-------------------------------+
         06

Rung M:46
     VACUUM     |EXPOSURE    |PLATE       |INTEGRATOR                        INTEGRATOR
     FRAME      |DELAY       |EXPOSE      |RESET                             START
     DOWN       |TIMER       |VACUUM      |TIMER                             RELAY
     LIMIT                   |INTERNAL
     SWITCH                  |RELAY
       110          041          011          033                             013
  +----] [---------] [---------] [---------]/[-------------------------------( )-----
         13           15           03           15                              14
```

```
Rung M:47
  | CRL         |DOOR       |EXPOSURE                                              LAMP
  | INTEGRATOR |INTERLOCKS |DELAY                                                  INTERLOCK
  |            |LIMIT      |TIMER
  |            |SWITCH
  |    111          111         041                                                   013
  +-----] [---------] [---------] [----------------------------------------------------( )-----
  |       03           07          15                                                  10

Rung M:48
  |    LOAD /    |LOAD       |VSV-2      |NEGATIVE    |DLC          MASK
  |    UNLOAD    |MASK       |NEGATIVE   |DOWN        |COUNTER      COUNTER
  |    MASK      |CIRCUIT    |VACUUM     |INTERNAL    |DELAYED      START
  |    PUSHBUTTON|           |CUPS       |RELAY                     INTERNAL
  |                                                                 RELAY
  |       110         010         012         011           111        015      ;
  +-+-----] [---------] [---------] [---------] [-----+-----]/[--------------------( )-----
  | |      07          02          15          00    |      01                     12
  | |   MASK                                         |
  | |   COUNTER                                      |
  | |   START                                        |
  | |   INTERNAL                                     |
  | |   RELAY                                        |
  | |      015                                       |
  | +-----] [-----------------------------------------+
  |        12

Rung M:49
  |    LOAD /    |NEGATIVE    |MASK                                                MASK
  |    UNLOAD    |LOAD        |COUNTER                                             COUNTER
  |    MASK      |VACUUM OFF  |START
  |    PUSHBUTTON|INTERNAL    |INTERNAL
  |              |RELAY       |RELAY
  |       110         011          015                                                013
  +-+-----] [---------] [-----+-----] [------------------------------------------------( )-----
  | |      07          01    |       12                                                12
  | |   MASK                 |
  | |   COUNTER              |
  | |      013               |
  | +-----] [-----------------+
  |        12

Rung M:50
  |   INTEGRATOR                                                 NUMBER
  |   START                                                      OF
  |   RELAY                                                      BURNS
  |      013                                                    +CTU---------------+  075
  +-----] [-----------------------------------------------------+COUNT UP          +-(CU)-
  |      14                                                     |Counter Addr: 075 |  17
  |                                                             |Preset:         1 |  075
  |                                                             |Accum:          0 +-(DN)
  |                                                             +------------------+  15
  |                                                                                    ;

Rung M:51
  | NUMBER
  | OF
  | BURNS
  |     075         013                                                                075
  +-----] [---------]/[------------------------------------------------------------------(CTR)-
  |      15          14

Rung M:52
  |    NUMBER      UNLOADER
  |    OF          PICK-UP
  |    BURNS       SEQUENCE
  |                TIMER
  |       075          035                                                              015
  +-+-----] [-----+----]/[---------------------------------------------------------------( )--
  | |      15    |      15                                                              14
  | |   015      |
  | +--] [-------+
  |     14
```

```
Rung M:53
  NUMBER      NUMBER                                                INHIBIT
  OF          OF                                                    PLATE
  BURNS       BURNS                                                 PICKUP 075         075                                                   015
+----] [--------]/[----------------------------------------------------( )-----
     17          15                                                    11

Rung M:54
  MASK                                                              SIGNAL
  COUNTER                                                           COUNTER
                                                                    START
    013                                                               013
+----] [--------------------------------------------------------------( )-----
     12                                                                13

Rung M:55
     INTEGRATOR    PRINT                          INTEGRATOR
     START         SEQUENCE                       RESET
     RELAY         INTERNAL                       TIMER
                   RELAY
                                                 +TON---------------------+ 033
     013            011                          +TIMER ON DELAY          +-(EN)-
+-+----] [-----+----] [--------------------------|Timer Addr:          033|  17
  |    14     |     02                           |Time base (sec):     0.1| 033
  |           |                                  |Preset:                5+-(DN)
  |           |                                  |Accum:                 0|  15
  |           |                                  +------------------------+
  | INTEGRATOR|
  | RESET     |
  | TIMER     |
  |    033    |
  +----] [----+
       17

Rung M:56
     END OF        INTEGRATOR RESET                                 PICK-UP
     LOAD          RESET      PRINT                                 SEQUENCE
     CYCLE         TIMER      SEQUENCE                              RESET
     INTERNAL                                                       INTERNAL
     RELAY                                                          RELAY
     010            033        011                                    011
+-+----] [-----+----]/[--------]/[-------------------------------------( )-----
  |    16     |    15          04                                      07
  | PICK-UP   |
  | SEQUENCE  |
  | RESET     |
  | INTERNAL  |
  | RELAY     |
  |    011    |
  +----] [----+
       07

Rung M:57
     CRL           INTEGRATOR                                       END OF
     INTEGRATOR    RESET                                            EXPOSE
                   TIMER                                            CYCLE
                                                                    INTERNAL
                                                                    RELAY
     111            033        044                                    011
+-+----]/[---------] [-----+----]/[-----------------------------------( )-----
  |    03              15  |    17                                     10
  | END OF                 |
  | EXPOSE                 |
  | CYCLE                  |
  | INTERNAL               |
  |    011                 |
  +----] [-----------------+
       10
```

```
Rung M:58
    END OF                                                           SV-10
    EXPOSE                                                           VACUUM
    CYCLE                                                            RELIEF
    INTERNAL
      011                                                              012
 +--+----] [-----+------------------------------------------------------( )-----
 |  |      10   |                                                       12
 |  RESET       |
 |  PRINT       |
 |  SEQUENCE    |
 |     011      |
 +----] [-------+
       04

Rung M:59
              END OF
              EXPOSE
              CYCLE
              INTERNAL
   110    012    011                                                    012
 +--]/[---]/[------] [--------------------------------------------------( )--
 |   12    02      10                                                    16

Rung M:60
    END OF                                             VACUUM
    EXPOSE                                             FRAME
    CYCLE                                              UP
    INTERNAL                                           DELAY
                                                       TIMER
      011                                     +TON---------------------+ 034
 +--+----] [----+                             +TIMER ON DELAY          +-(EN)-
 |  |     10   |                              |Timer Addr:         034|  17
 |  |          |                              |Time base (sec):    0.1|  034
 |  |          |                              |Preset:               5+-(DN)
 |  |          |                              |Accum:                0|  15
 |  |          |                              +------------------------+
 |  |          |
 |  RESET     |
 |  PRINT     |
 |  SEQUENCE  |
 |     011    |
 +----] [-----+
       04

Rung M:61
    END OF       VACUUM       PICK-UP                                UNLOADER
    EXPOSE       FRAME UP     SEQUENCE                               SEQUENCE
    CYCLE        LIMIT        RESET                                  INTERNAL
    INTERNAL     SWITCH                                              RELAY
      011         110           011                                    011
 +--+----] [----+----] [---------]/[------------------------------------( )-----
 |  |     10        12           17                                     11
 |  UNLOADER
 |  SEQUENCE
 |  INTERNAL
 |  RELAY
 |     011
 +----] [-----+
       11
```

```
Rung M:62
    UNLOADER    UNLOADER    EXIT       DOOR                                    SV-3
    SEQUENCE    PICK-UP     FILM       INTERLOCKS                              EXIT
    INTERNAL    SEQUENCE    ONLY       LIMIT                                   TRANSPORT
    RELAY       TIMER                  SWITCH                                  FORWARD
    011         035         011        111                                     012
+-+----] [---------]/[---------]/[---------] [-----+----------------------( )-----
  |      11          15          15           07   |                           03
  |   EXIT         DOOR        SV-3                |
  |   TRANSPORT    INTERLOCK   EXIT                |
  |   FORWARD      LIMIT       TRANSPORT           |
  |   LIMIT        SWITCH      FORWARD             |
  |   SWITCH                                       |
  |   111          111         012                 |
  +----] [---------]/[---------] [-----------------+
       05           07           03

Rung M:63
    UNLOADER                FILM                                               EXIT
    SEQUENCE                PICKUP                                             CYLINDER
    INTERNAL                SEQUENCE                                           POSITION
    RELAY                                                                      BRAKE
    011         111         076                                                012
+-+----] [-------] [-----------]/[-----+----------------------------------( )-----
  |      11         04           15    |                                       14
  |   UNLOADER    EXIT         UNLOADER|
  |   SEQUENCE    TRANSPORT    PICK-UP |
  |   INTERNAL    FORWARD      SEQUENCE|
  |   RELAY       LIMIT        TIMER   |
  |               SWITCH               |
  |   011         111          035     |
  +----] [---------] [---------]/[-----+
       11           05           15

Rung M:64
    EXIT        LEFT                                          FILM
    CYLINDER    ENCODER                                       PICKUP
    BRAKE       COUNTER                                       SEQUENCE
                TIMER
    012         044                                      +TON----------------------+  076
+-+----] [-----+----]/[----------------------------------+TIMER ON DELAY           +-(EN)-
  |      14    |      15                                 |Timer Addr:         076|   17
  |            |                                         |Time base (sec):    0.1|  076
  |            |                                         |Preset:              15+-(DN)
  |            |                                         |Accum:                0|   15
  |   FILM     |                                         +-------------------------+
  |   PICKUP   |
  |   SEQUENCE |
  |   076      |
  +----] [-----+
       17

Rung M:65
   FILM                                                                        FILM
   PICKUP                                                                      EXIT
   SEQUENCE                                                                    PICKUP
                                                                               CYLINDER
   076         076    123                                                      013
+----] [-------]G[---]<[-----------------------------------------------( )-----
      17         0     10                                                      02

Rung M:66
                FILM        FILM
                PICKUP      EXIT
                SEQUENCE    VACUUM
                            OFF
    076   123   076         015                                                013
+-+--]G[---]<[--+----] [---------]/[-------------------------------------( )--
  |   0    10   |      17           10                                         05
  |   013       |
  +--] [--------+
       05
```

```
Rung M:67
|       FILM
|       PICKUP
|       SEQUENCE
|     015       076                                                                      011
+---]/[------] [--------------------------------------------------------------------( )---
|      14       15                                                                        15

Rung M:68
|    NEGATIVE    |UNLOADER     |PROCESSOR  |EXIT         |            |EXIT
|    VACUUM      |SEQUENCE     |INTERLOCK  |TRANSPORT    |            |TRANSFER
|    FAULT       |INTERNAL     |           |FORWARD      |            |PARK
|    INTERNAL    |RELAY        |           |LIMIT        |            |LIMIT
|    RELAY       |             |           |SWITCH       |            |SWITCH
|     016         011           111          111           015          111                >
+-+---] [--------] [----------] [----------] [----------] [--+-----]/[--------------------->
| |    13          11            17           05            14          06                >
| |
| |   UNLOADER
| |   PICK-UP
| |   SEQUENCE
| |   TIMER
| |    035
| +----] [------------------------------------------------+
|       17

UNLOADER
                                                              PICK-UP
                                                              SEQUENCE
                                                              TIMER
                                                      <+TON---------------------+  035
                                                      <+TIMER ON DELAY          +-(EN)-
                                                      < |Timer Addr:       035|   17
                                                        |Time base (sec): 0.1|  035
                                                        |Preset:            25+-(DN)
                                                        |Accum:              0|  15
                                                      +------------------------+

Rung M:69
|   UNLOADER     |UNLOADER
|   PICK-UP      |PICK-UP
|   SEQUENCE     |SEQUENCE                                                   SV-8
|   TIMER        |TIMER                                                      UNLOAD
|                |                                                           CYLINDER
|    035           035         155                                           EXTEND
|                                                                             012
+----] [---------]G[---------]<[-----------------------------------------( )-----
|      17          0           14                                             10

Rung M:70
|   FILM         |EXIT                                                     FILM
|   PICKUP       |TRANSFER                                                 EXIT
|   SEQUENCE     |PARK                                                     CYCLE
|                |INTERNAL
|                |L.S.
|    076          111                                           +TON---------------------+ 044
+----] [---------] [--------------------------------------------+TIMER ON DELAY          +-(EN)-
|      15          06                                            |Timer Addr:       044|   17
|                                                                |Time base (sec): 1.0|  044
|                                                                |Preset:             8+-(DN)
|                                                                |Accum:              0|  15
|                                                                +------------------------+
```

```
Rung M:71
| EXIT                                                                          EXIT
| CONVEYOR                                                                      CONVEYOR
| REVERSE                                                                       FORWARD
|  013                                                                           013
+----]/[------------------------------------------------------------------------( )-----
|  15                                                                            11

Rung M:72
|                              LEFT                                             EXIT
|                              ENCODER                                          CONVEYOR
|                              COUNTER                                          REVERSE
|                              TIMER
|  044         020             044                                              013
+-+---]G[---------]=[-----+----]/[-----------------------------------------------( )-----
| |    0           5      |    15                                                15
| | EXIT                  |
| | CONVEYOR              |
| | REVERSE               |
| |   013                 |
| +-----] [---------------+
|        15

Rung M:73
|                   LEFT                                                        FILM
|                   ENCODER                                                     EXIT
|                   COUNTER                                                     VACUUM
|                   TIMER                                                       OFF
|   044    153      044                                                          015
+---]G[----]=[------]/[---------------------------------------------------------( )-----
|    0      3       15                                                           10

Rung M:74
|  UNLOADER                    EXIT                                             UNLOAD
|  PICK-UP                     TRANSFER                                         PLATE
|  SEQUENCE                    PARK                                             VACUUM ON
|  TIMER                       LIMIT                                            INTERNAL
|                              SWITCH                                           RELAY
|   035        153             111                                               011
+-+----]G[---------]=[----+----]/[-----------------------------------------------( )-----
| |    0           3      |    06                                                12
| | UNLOAD                |
| | PLATE                 |
| | VACUUM ON             |
| | INTERNAL              |
| | RELAY                 |
| |   011                 |
| +-----] [---------------+
|        12

Rung M:75
|   VSV-3         UNLOAD       UNLOADER                                         VSV-6
|   PLATE         PLATE        PICK-UP                                          PLATE
|   EXPOSE        VACUUM ON    SEQUENCE                                         UNLOAD
|   VACUUM        INTERNAL     TIMER                                            VACUUM
|                 RELAY
|   012           011          035                                               013
+-+----] [---------] [----+----] [-----------------------------------------------( )-----
| |   17           12     |   17                                                 04
| | VSV-6                 |
| | PLATE                 |
| | UNLOAD                |
| | VACUUM                |
| |   013                 |
| +-----] [---------------+
|        04
```

```
Rung M:76
    VSV-8           EXIT           ASSIST         VACUUM                          SV-9
    NEGATIVE        TRANSFER       AIR            FRAME                           NEGATIVE
    EXIT            PARK           OFF            DOWN                            EXIT
    VACUUM          INTERNAL       TIMER          LIMIT                           AIR ASSIST
                    L.S.                          SWITCH                          TIMER
     013             111            040            110                             012
  +-+----] [-----+----] [---------]/[---------] [----------------------------( )-----
  | |    06     |    06            15             13                              11
  |   PROCESS   |
  |   RELAY     |
  |    013      |
  +----] [------+
        07

Rung M:77
    SV-9            VACUUM                                        ASSIST
    NEGATIVE        FRAME                                         AIR
    EXIT            DOWN                                          OFF
    AIR             LIMIT                                         TIMER
    ASSIST          SWITCH
                                                               +TON---------------------+ 040
     012             110                                       +TIMER ON DELAY          +-(EN)-
  +-----] [---------] [------------------------------------+   |Timer Addr:        040|   17
        11            13                                       |Time base (sec):   1.0|  040
                                                               |Preset:              2+-(DN)
                                                               |Accum:               0|   15
                                                               +------------------------+

Rung M:78
    MASK            VSV-4          UNLOAD         UNLOADER       VACUUM          VSV-8
    COUNTER         NEGATIVE       PLATE          PICK-UP        FRAME           NEGATIVE
    INSTANTAN-      EXPOSE         VACUUM ON      SEQUENCE       DOOWN           EXIT
    EOUS            VACUUM         INTERNAL       TIMER          LIMIT           VACUUM
    CONTACT                        RELAY                         SWITCH
     110             013            011            035            110             013
  +-+----]/[---------] [---------] [---------] [-----+----]/[----------------( )-----
  | |   17            01            12             17 |           13              06
  |   VSV-8          |
  |   NEGATIVE       |
  |   EXIT           |
  |   VACUUM         |
  |    013           |
  +----] [-----------+
        06

Rung M:79
    UNLOADER                       PICK-UP                                       PLATE
    PICK-UP                        SEQUENCE                                      PRINT
    SEQUENCE                       RESET                                         VACUUM OFF
    TIMER                                                                        INTERNAL
                                                                                 RELAY
     035             154            011                                           011
  +-+----]G[--------]=[--+----]/[----------------------------------------------( )-----
  | |    0            4 |    17                                                   13
  |   PLATE             |
  |   PRINT             |
  |   VACUUM OFF        |
  |   INTERNAL          |
  |   RELAY             |
  |    011              |
  +----] [--------------+
        13

Rung M:80
    PLATE           VSV-8                                                        NEGATIVE
    PRINT           NEGATIVE                                                     PRINT
    VACUUM OFF      EXIT                                                         VACUUM
    INTERNAL        VACUUM                                                       INTERNAL
    RELAY                                                                        RELAY
     011             013                                                          011
  +----] [---------] [---------------------------------------------------------( )-----
  |    13            06                                                            14 ;
```

```
Rung M:81
                           PICK-UP                                              UNLOAD
                           SEQUENCE                                             PICK-UP
                           RESET                                                CYLINDER
                                                                                RETRACT
                                                                                INT. RELAY
         076         123         011                                                011
+-+---]G[---------]=[--+----]/[-------------------------------------------------( )-----
| |     0            10 |       17                                                  16
| | UNLOAD              |
| | PICK-UP             |
| | CYLINDER            |
| | RETRACT             |
| | INT. RELAY          |
| |    011              |
| +----] [--------------+
|       16

Rung M:82
  | UNLOAD      |EXIT                                                           PICKUP
  | PICK-UP     |TRANSFER                                                       SEQUENCE
  | CYLINDER    |PARK                                                           RESET
  | RETRACT     |INTERNAL                                                       INTERNAL
  | INT. RELAY  |L.S.                                                           RELAY
  |    011      |  111                                                            011
+----] [---------] [-----------------------------------------------------------( )-----
|      16         06                                                              17

Rung M:83
  | END OF      |PRINT        |END          |UNLOADER     |PROCESS
  | CYCLE       |SEQUENCE     |EXPOSE       |SEQUENCE     |SHUTOFF
  | INTERNAL    |INTERNAL     |CYCLE        |INTERNAL
  | RELAY       |RELAY        |INTERNAL     |RELAY
  |             |             |RELAY        |
  |    010         011           011            011           036                       >
+-+----] [---------]/[----------]/[-----------]/[------+----]/[------------------------>
| |     11          02            10             11    |      15                       >
| |                                                    |
| |  PROCESS                                           |
| |  SHUT-OFF                                          |
| |  TIMER                                             |
| |     036                                            |
| +----] [--------------------------------------------+
|       17

PROCESS
                                                                          SHUT-OFF
                                                                          TIMER
                                                          <+TON---------------------+  036
                                                          <+TIMER ON DELAY          +-(EN)-
                                                          < |Timer Addr:        036|   17
                                                            |Time base (sec):   1.0|  036
                                                            |Preset:             10+-(DN)
                                                            |Accum:               0|   15
                                                            +-----------------------+
```

```
Rung M:84
    VSV-8          EXIT         NEGATIVE     END OF
    NEGATIVE       TRANSFER     RELEASE      CYCLE
    EXIT           PARK         TIMER        INTERNAL
    VACUUM         INTERNAL                  RELAY
                   L.S.
         013           111          037          010                                   >
+-+----] [---------] [-----+----]/[---------] [--------------------------------------->
  |      06            06   |      15           11                                    >
  |                         |
  |                         |
  |   NEGATIVE              |
  |   RELEASE               |
  |   TIMER                 |
  |       037               |
  +----] [------------------+
         17

NEGATIVE
                                                          RELEASE
                                                          TIMER
                                              <+TON----------------------+  037
                                              <+TIMER ON DELAY          +-(EN)-
                                              < |Timer Addr:        037|  17
                                                |Time base (sec):   1.0|  037
                                                |Preset:              6+-(DN)
                                                |Accum:               0|  15
                                                +----------------------+

Rung M:85
    NEGATIVE                  NEGATIVE                                          VACUUM
    RELEASE                   RELEASE                                           FRAME
    TIMER                     TIMER                                             DOWN
                                                                                INTERNAL
                                                                                RELAY
         037         067          037                                             016
+-+----]G[-------]=[--+----]/[---------------------------------------------------( )-----
  |      0         2  |      15                                                    06
  |   VACUUM          |
  |   FRAME           |
  |   DOWN            |
  |   INTERNAL        |
  |   RELAY           |
  |       016         |
  +----] [------------+
         06

Rung M:86
|
+---------------------------------------------------------------------------------(MCR)-
|

Rung M:87
    LOAD          |PICKUP       |PLATE        |NEGATIVE      PROCESS     |CANCEL
    PLATE         |POSITION     |PICKUP       |PICK UP       RELAY       |PUSHBUTTON
    PUSHBUTTON    |LIMIT        |CYLINDER     |CYLINDER                  |
                  |SWITCH       |UP LIMIT     |UP LIMIT                  |
                                |SWITCH       |SWITCH                    |
         110           110          110          110           013          110
+-+----] [---------] [---------] [---------] [-----+----]/[---------]/[-------------:
  |      02            03           04           05  |      07           01
  |   LOAD                                           |
  |   SEQUENCE                                       |
  |   INTERNAL                                       |
  |   RELAY                                          |
  |       016                                        |
  +----] [-------------------------------------------+
         00
```

```
                                                    |VACUUM      |LOAD
                                                    |FRAME UP    |SEQUENCE
                                                    |LIMIT       |INTERNAL
                                                    |SWITCH      |RELAY
                                                    <   110          016
                                                    <---] [--------( )-----
                                                    <    12           00
                                                                              ;

Rung M:88
 | LOAD                                                           LOAD
 | SEQUENCE                                                       MOMEN.
 | INTERNAL                                                       PARK
 | RELAY                                                          POSITION
 |                                                                TIMER
 |                                                              +TON-------------------+  042
 |   016                                                        +TIMER ON DELAY        +-(EN)-
 +----] [-------------------------------------------------------+Timer Addr:       042|   17
 |     00                                                       |Time base (sec):  0.1|  042
 |                                                              |Preset:           10 +-(DN)
 |                                                              |Accum:             0 |   15
 |                                                              +-----------------------+

Rung M:89
 |  SV-1         |DOOR        |LSI-MC      |PICKUP      |PLATE        |NEGATIVE
 |  FEED         |INTERLOCKS  |MAGAZINE    |POSITION    |PICKUP       |PICK UP
 |  TRANSFER     |LIMIT       |COVER       |LIMIT       |CYLINDER     |CYLINDER
 |  REGISTER     |SWITCH      |LIMIT       |SWITCH      |UP LIMIT     |UP LIMIT
 |  POSITION     |            |SWITCH      |            |SWITCH       |SWITCH
 |    012           111          111          110           110           110                  >
 +-+----]/[---------] [---------] [---------] [-----------] [-----------] [-----------------   >
 | |   01            07           13           03            04            05                  >
 | |  SV-1         |DOOR        |LSI-MC      |PLATE        |NEGATIVE
 | |  FEED         |INTERLOCKS  |MAGAZINE    |PICKUP       |PICK UP
 | |  TRANSFER     |LIMIT       |COVER       |CYLINDER     |CYLINDER
 | |  REGISTER     |SWITCH      |LIMIT       |UP LIMIT     |UP LIMIT
 | |  POSITION     |            |SWITCH      |SWITCH       |SWITCH
 | |    012           111          111          110           110                              >
 + +----]/[---------] [---------] [-----------] [-----------] [-------------------------       >
 | |   01            07           13            04            05                               >
 | |  SV-1         |DOOR        |LSI-MC      |PROCESS
 | |  FEED         |INTERLOCKS  |MAGAZINE    |RELAY
 | |  TRANSFER     |LIMIT       |COVER
 | |  REGISTER     |SWITCH      |LIMIT
 | |  POSITION     |            |SWITCH
 | |    012           111          111          014                                            >
 + +----]/[---------] [---------] [-----------] [--------------------------------------        >
 |     01            07           13            00                                             >

;
                                                    .|LOAD         |SV-1
                                                    |MOMEN.        |FEED
                                                    |PARK          |TRANSFER
                                                    |POSITION      |REGISTER
                                                    |TIMER         |POSITION
                                                    <  042             012
                                                    <---] [-----+----( )-----
                                                    <    17     |      00
                                                                |
                                                    <-----------+
                                                    <           |
                                                               +++

+++
                                                    <           |
                                                    <-----------+
                                                    <
```

```
Rung M:90
     LOAD              DOOR                                              SV-1
     POSITION          INTERLOCKS                                        FEED
     INTERNAL          LIMIT                                             TRANSFER
     RELAY             SWITCH                                            REGISTER
                                                                         POSITION
        016             111       111    111                              012
+-+----] [-----+-----] [-------]/[----]/[-------------------------------( )-----
| |     01    |      07        05     04                                  01
| | LOAD      |
| | MOMEN.    |
| | PARK      |
| | POSITION  |
| | TIMER     |
| |   042     |
| +----] [----+
| |    15    |
| | LOADER   |
| | LOAD     |
| | POSITION |
| | INTERNAL |
| | RELAY    |
| |   016    |
| +----] [---+
|       03

Rung M:91
     LOAD                                                                SV-4
     POSITION                                                            REGISTER
     PINS UP                                                             PINS
     INTERNAL                                                            UP
     RELAY
        010                                                               012
+-+----] [-----------------+--------------------------------------------( )------
| |    13                  |                                              04
| | PLATE      |PROCESS    |
| | REGISTER   |RELAY      |
| | LIMIT      |           |
| | SWITCH     |           |
| |   110      |   013     |
| +----] [--------] [------+
| |    14          07      |
| | PLATE      |LOAD       |
| | REGISTER   |SEQUENCE   |
| | LIMIT      |INTERNAL   |
| | SWITCH     |RELAY      |
| |   110      |   016     |
| +----] [--------] [------+
|      14          00

Rung M:92
     PLATE                                                               SV-5
     REGISTER                                                            PLATE
     STOPS                                                               REGISTER
     EXTENDED                                                            STOPS
     INT. RELAY
        016                                                               012
+-+----] [-----+--------------------------------------------------------( )-----
| |    05     |                                                           05
| | LOAD      |
| | SEQUENCE  |
| | INTERNAL  |
| | RELAY     |
| |   016     |
| +----] [----+
|       00
```

```
Rung M:93
     EMPTY         NEGATIVE      PROCESS     CANCEL                          EMPTY
     PLATE         VACUUM ON     PUSHBUTTON  PUSHBUTTON                      PLATE
     STATION       INTERNAL                                                  ALARM
     INTERNAL      RELAY                                                     SEQUENCE
     RELAY                                                                   INT. RELAY
     010           010           110         110                             016
+-+-----] [---------] [-----+-----]/[---------]/[-----------------------( )-----
| |      04          01     |     00          01                             02
| | EMPTY         MASK       |
| | PLATE         COUNTER    |
| | STATION       INSTANTAN- |
| | INTERNAL      EOUS       |
| | RELAY         CONTACT    |
| | 010           110        |
| +-----] [---------] [------+
| |      04          17      |
| | EMPTY                    |
| | PLATE                    |
| | ALARM                    |
| | SEQUENCE                 |
| | INT. RELAY               |
| | 016                      |
| +-----] [-----------------+
|        02

Rung M:94
     EMPTY         VACUUM        SV-3         PLATE         NEGATIVE         LOADER
     PLATE         FRAME UP      EXIT         PICKUP        PICK UP          LOAD
     ALARM         LIMIT         TRANSPORT    CYLINDER      CYLINDER         POSITION
     SEQUENCE      SWITCH        FORWARD      UP LIMIT      UP LIMIT         INTERNAL
     INT. RELAY                               SWITCH        SWITCH           RELAY
     016           110           012          110           110              016
+-----] [---------] [---------]/[---------] [---------] [-------------------( )-----
      02           12           03           04            05                03

Rung M:95
     EMPTY         SIGNAL                                   SIGNAL
     PLATE         SEQUENCE                                 SEQUENCE
     ALARM         TIMER                                    TIMER
     SEQUENCE
     INT. RELAY
     016           043                                 +TON--------------------+  043
+-+-----] [-----+-----]/[--------------------------+TIMER ON DELAY            +-(EN)-
| |     02     |    15                             |Timer Addr:         043|    17
| |            |                                   |Time base (sec):    0.1|   043
| |            |                                   |Preset:              10+-(DN)
| |            |                                   |Accum:                0|    15
| | SIGNAL    |                                   +------------------------+
| | COUNTER   |
| | DELAYED   |
| | 111       |
| +-----] [---+
|       02
```

```
Rung M:96
    EMPTY        SIGNAL                                                                SIGNAL
    PLATE        SEQUENCE                                                              LIGHT
    ALARM        TIMER                                                                 AND
    SEQUENCE                                                                           ALARM
    INT. RELAY
       016          043        157                                                       013   ;
+--+----] [---------]G[-------]<[--+------------------------------------------------------( )-----
   |     02           0         7  |                                                      17
   |              EXIT             |
   |              TRANSFER         |
   |              PARK             |
   |              LIMIT            |
   |              SWITCH           |
   |   016           111           |
   +--]/[----------]/[-------------+
   |    13           06            |
   |  SIGNAL       SIGNAL          |
   |  COUNTER      SEQUENCE        |
   |  DELAYED      TIMER           |
   |   111           043        153|
   +----] [---------]G[-------]<[--+
        02            0         3
```

```
Rung M:97
                                                                                       LOW
                                                                                       BATTERY
                                                                                       INDICATOR
       027                                                                               013
+--+----] [------+-------------------------------------------------------------------------( )-----
   |    00       |                                                                         16
   |   LOW       |
   |   BATTERY   |
   |   SIGNAL    |
   |   INTERNAL  |
   |   RELAY     |
   |    017      |
   +----] [------+
        05
```

```
Rung M:98
    PROCESS                                                                            SV-15
    RELAY                                                                              REAR
                                                                                       REGISTER
                                                                                       PINS
                                                                                       UP
       013                                                                               014
+----]/[----------------------------------------------------------------------------------( )-----
      07                                                                                 03
                                                                                              ;
```

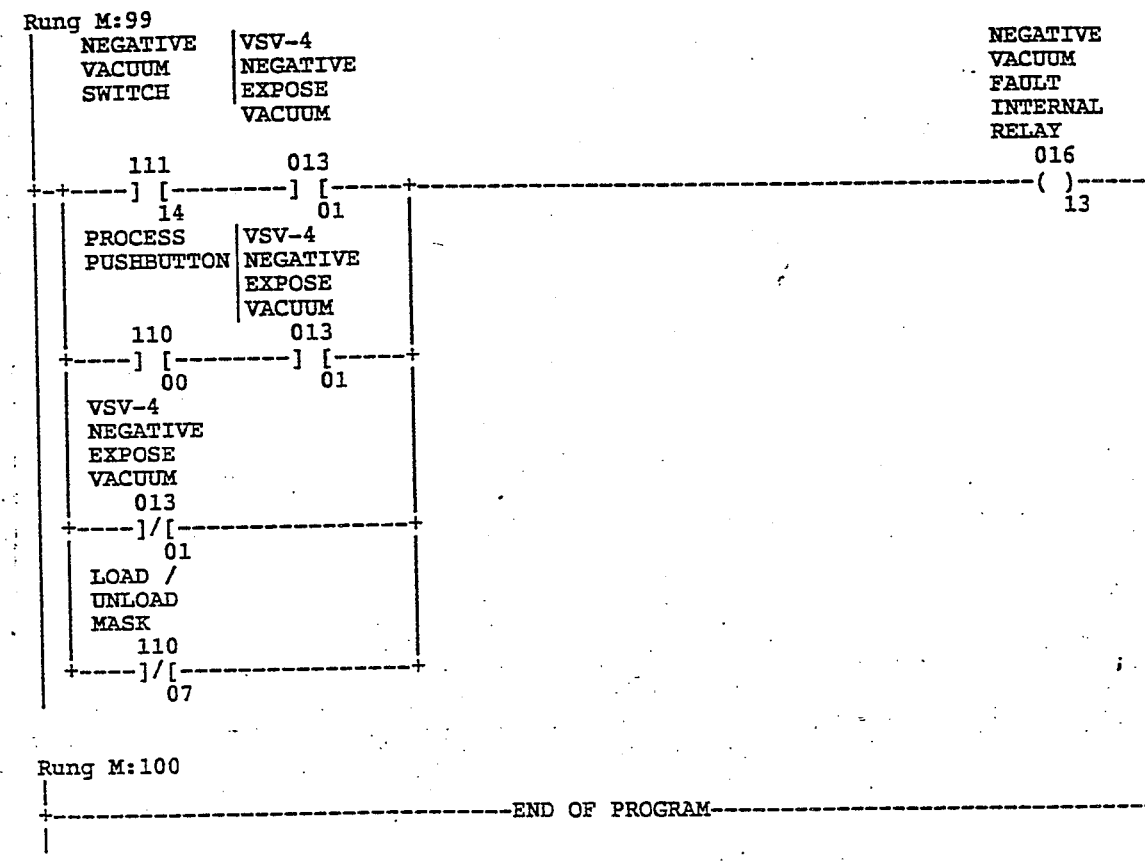

Rung M:100

+------------------------------END OF PROGRAM------------------------------

What is claimed is:

1. Apparatus for exposing photosensitized plates to light through films and masks, comprising:
   an exposure station at which a plate may be exposed to light through a film overlying the plate and through a mask overlying the film and plate,
   a support at the exposure station for supporting the superposed plate, film and mask,
   a window at the exposure station movable downwardly from a raised position spaced above the support to a lowered position for exposure of the plate through the window, mask and film to a light source,
   means associated with the window operable to grip the mask to the bottom of the window, the window being movable to its raised position while gripping the mask after exposure of the plate,
   a discharge carriage movable from a forward position forward of the exposure station to a rearward position at the exposure station when said window is in its raised position,
   film discharge gripper means movable up and down on the discharge carriage and operable to grip a film overlying a plate on said support,
   plate discharge gripper means movable up and down on the discharge carriage and operable to grip a plate on said support,
   mask discharge gripper means movable up and down on the discharge carriage and operable to grip a mask on said window, and
   means for operating the discharge carriage and each of said film, plate and mask discharge gripper means to move the discharge carriage rearwardly from its forward position to its rearward position when the window is in its raised position and gripping a mask, to lower the film discharge gripper means and actuate it to grip a film overlying a plate, to move the film discharge gripper means while gripping the film thereby to expose a portion of the plate under the film, to lower the plate discharge gripper means and to actuate it to grip said exposed portion of the plate, to raise the mask discharge gripper means and to actuate it to grip the mask on the window, and to move the discharge carriage forwardly to its forward position and deactuate the film, plate and mask discharge gripper means to release the film, plate and mask, respectively.

2. Apparatus as set forth in claim 1 wherein said means for operating the discharge carriage is operable to move the film discharge gripper means while gripping said film a short distance in the rearward direction to expose a forward portion of said plate under the film.

3. Apparatus as set forth in claim 2 wherein said film discharge gripper means is affixed to the discharge carriage, and movement of the film discharge gripper means said short distance in the rearward direction is effected by movement by discharge carriage a corresponding distance in the rearward direction.

4. Apparatus as set forth in claim 1 further comprising a reversible exit conveyor forward of the exposure station operable in a forward direction for conveying items thereon in a forward direction, and in a reverse direction for conveying items thereon in a rearward direction, and a space between the exposure station and the rearward end of the exit conveyor, said plate discharge gripper means being operable when the discharge carriage is in its forward position to release a plate onto the exit conveyor for conveyance in forward direction for exit from apparatus, and said film discharge gripper means being operable to release a film onto the exit conveyor following which release the conveyor is operable to reverse direction to convey the film for deposit through said space.

5. Apparatus as set forth in claim 4 having a return conveyor below said space for conveying films to a predetermined location.

6. Apparatus as set forth in claim 5 wherein said discharge carriage has a chute for travel of masks released by the mask discharge gripper means when the discharge carriage is in its forward position through said space, said mask discharge gripper means being operable to release a mask when the discharge carriage is in its forward position following deposit of said film through said space.

7. Apparatus as set forth in claim 1 wherein each of said plate discharge gripper means and said film discharge gripper means comprises downwardly facing suction cup means on the discharge carriage for vacuum gripping a respective plate or film, and cylinder means on the discharge carriage for moving said suction cup means down for gripping a respective plate or film at the exposure station and up to pick up the plate or film for carrying it away, and wherein said mask discharge gripper means comprising upwardly facing suction cup means for vacuum gripping a mask, and cylinder means on the discharge carriage for moving the latter suction cup means up for gripping a mask on the bottom of said window and down for carrying the mask away.

8. Apparatus as set forth in claim 1 further comprising means on the discharge carriage for blowing air between the plate and the film as gripped by said plate and film discharge gripper means at the exposure station.

9. An automated method of exposing photosensitized plates to light through masks and films at an exposure station, said method comprising the following steps:

placing a plate, film and mask at the exposure station in superposed relation to one another with the film overlying the plate and the mask overlying the film;

exposing the plate to light through the mask and film at the exposure station;

raising the mask off the film to a raised position;

gripping the film and moving it relative to the plate to expose a portion of the plate therebelow;

gripping the exposed portion of the plate;

gripping the mask in its raised position;

moving the film, plate and mask forwardly while so gripped to a discharge station; and releasing the film, plate and mask at the discharge station.

10. A method as set forth in claim 9 further comprising releasing the plate onto an exit conveyor at said discharge station, operating the exit conveyor to convey the plate to a first predetermined location, releasing the film onto the exit conveyor after the plate has been released, and reversing the direction of the exit conveyor after the film has been released for conveyance of the film to a second predetermined location.

11. A method as set forth in claim 10 wherein the direction of the exit conveyor is not reversed until after said plate has been conveyed off the exit conveyor.

12. A method as set forth in claim 10 further comprising releasing the mask after the film has been released for conveyance of the mask to said second predetermined location.

13. A method as set forth in claim 9 wherein the film is moved rearwardly a short distance relative to the plate to expose said portion of the plate.

14. A method as set forth in claim 9 wherein the film is raised before the plate is gripped at the exposure station, said method further comprising blowing air between the plate and film after the film has been raised.

* * * * *